(12) United States Patent
Segroves et al.

(10) Patent No.: US 7,035,519 B2
(45) Date of Patent: Apr. 25, 2006

(54) FIBER OPTIC CONNECTOR REMOVAL TOOL

(75) Inventors: Roger D. Segroves, Lockport, IL (US); Robert F. Levin, Braceville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/833,699

(22) Filed: Apr. 28, 2004

(65) Prior Publication Data

US 2004/0218885 A1    Nov. 4, 2004

Related U.S. Application Data

(60) Provisional application No. 60/497,389, filed on Aug. 22, 2003, provisional application No. 60/483,492, filed on Jun. 27, 2003, provisional application No. 60/467,297, filed on May 2, 2003.

(51) Int. Cl.
*G02B 6/00* (2006.01)

(52) U.S. Cl. .................. 385/134; 385/136; 385/147

(58) Field of Classification Search ......... 385/134–140
See application file for complete search history.

(56) References Cited

U.S. PATENT DOCUMENTS

| | | | |
|---|---|---|---|
| 2,916,323 A | 12/1959 | VanBerkum | |
| 3,627,367 A | 12/1971 | Levy | |
| 3,951,514 A | 4/1976 | Medina, Jr. | |
| 3,995,363 A | 12/1976 | Medina, Jr. | |
| 4,084,882 A | 4/1978 | Hogan et al. | |
| 4,155,159 A | 5/1979 | Hogan et al. | |
| 4,290,193 A | 9/1981 | Anderton et al. | |
| 4,494,305 A | 1/1985 | Safai | |
| 4,507,923 A | 4/1985 | Trabbic | |
| 4,669,769 A | 6/1987 | Polder, Jr. | |
| 4,821,610 A | 4/1989 | Redmon, Jr. et al. | |
| 4,852,925 A | 8/1989 | Lodin | |
| 5,187,851 A | 2/1993 | Klinger | |
| 5,210,934 A | 5/1993 | Lenzi et al. | |
| 5,469,613 A | 11/1995 | McMills et al. | |
| 5,956,832 A | 9/1999 | Reagan | |
| 6,196,731 B1 | 3/2001 | Carlisle et al. | |
| 6,202,295 B1 | 3/2001 | Easter et al. | |
| 6,282,348 B1 | 8/2001 | Carlisle et al. | |
| 2003/0101266 A1* | 5/2003 | Trossen ..................... 709/227 |
| 2003/0190133 A1* | 10/2003 | Adams ........................ 385/134 |

FOREIGN PATENT DOCUMENTS

| | | |
|---|---|---|
| FR | 2 501 426 | 9/1982 |
| JP | 6-102433 | 4/1994 |
| JP | 7-281056 | 10/1995 |

* cited by examiner

*Primary Examiner*—John D. Lee
*Assistant Examiner*—Tina M. Wong
(74) *Attorney, Agent, or Firm*—Robert A. McCann; Zachary J. Smolinski

(57) ABSTRACT

The invention pertains to tools for removing connectors from high-density fiber optic applications, and more particularly to a tool having pivotable arms with cooperative gripping ends for facilitating the gripping, removal, and insertion of fiber optic connectors into appropriate ports or adapters.

14 Claims, 25 Drawing Sheets

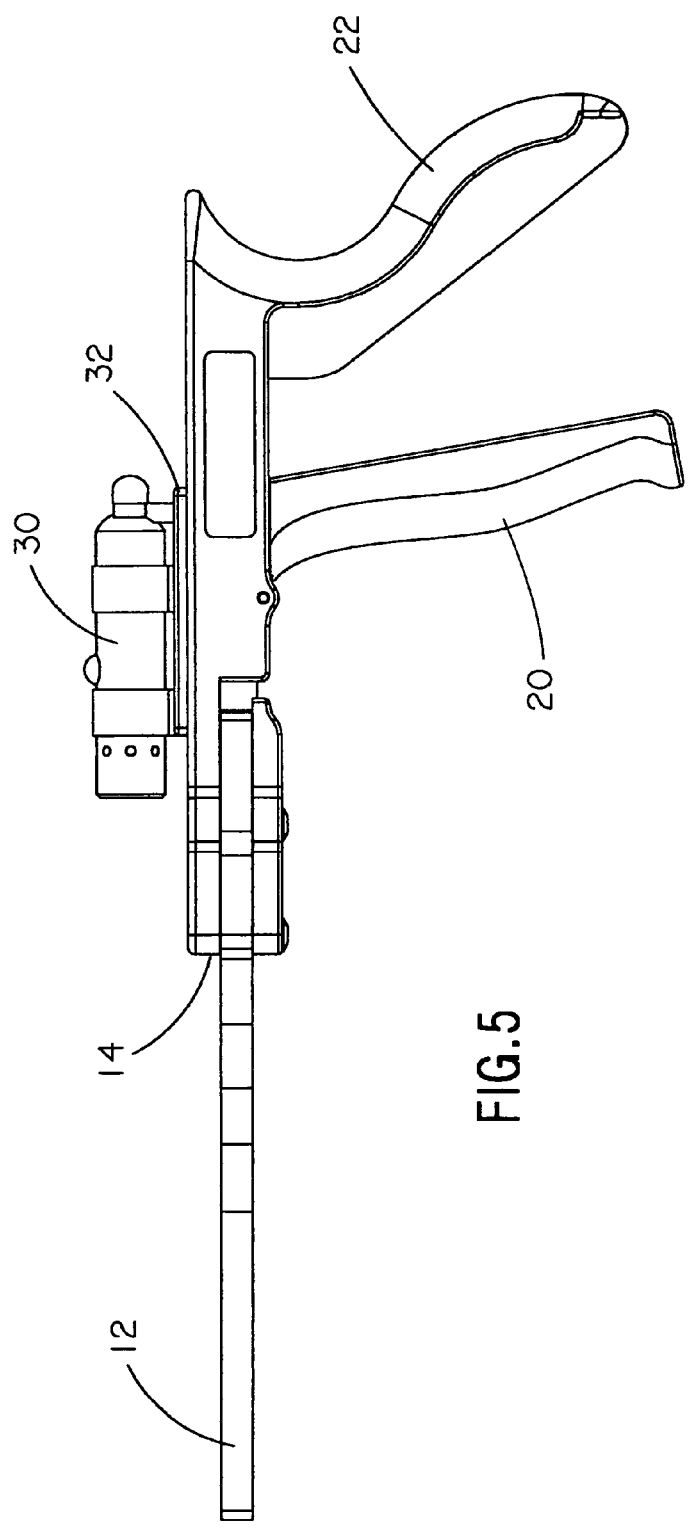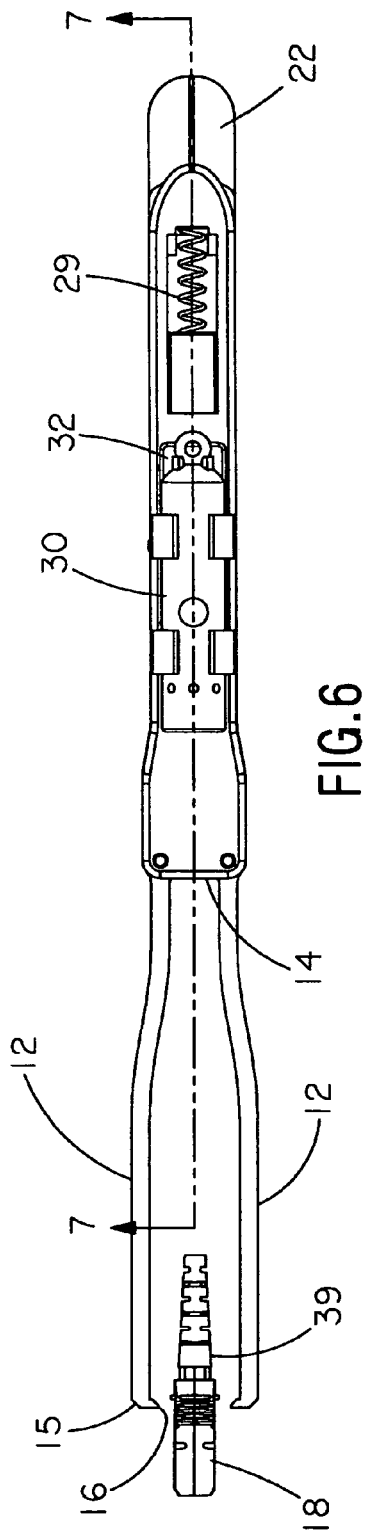
FIG. 5
FIG. 6

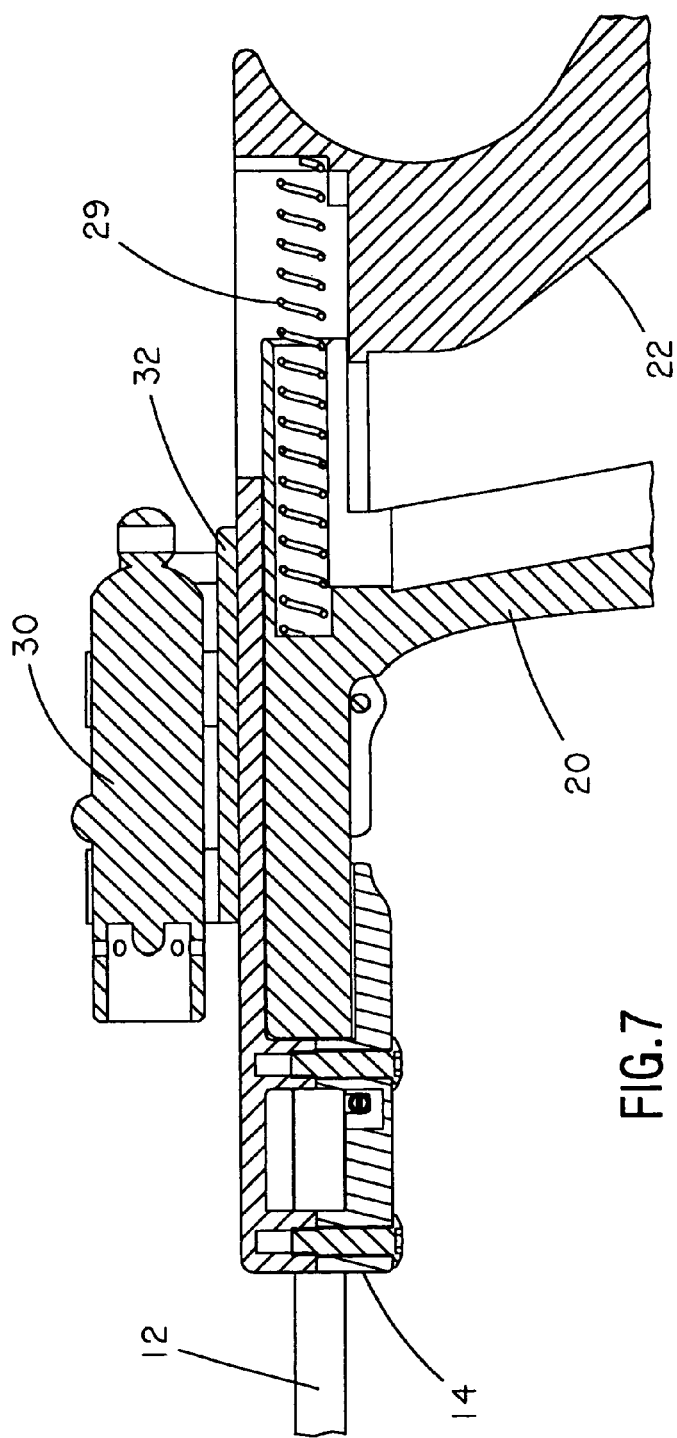
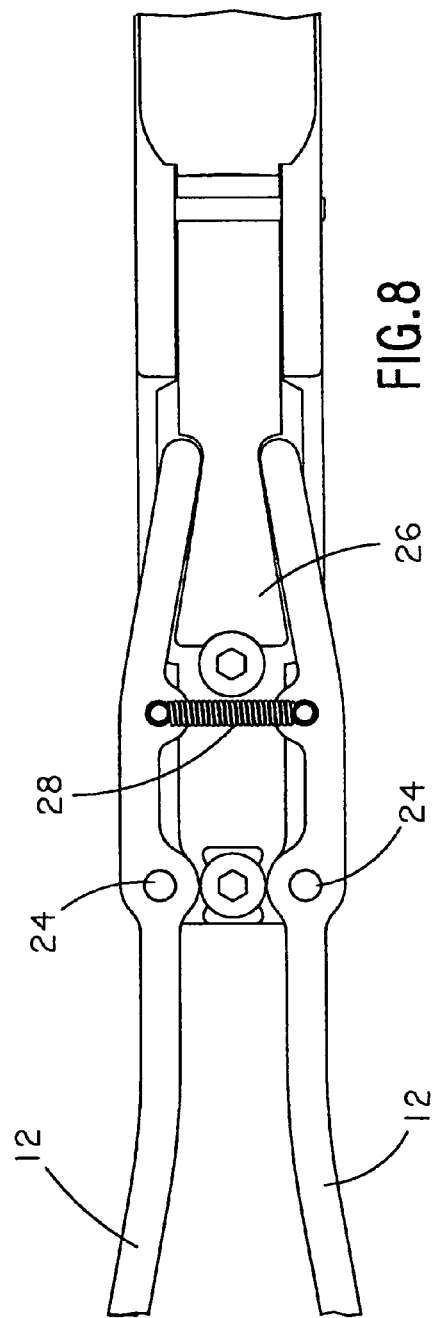
FIG. 7
FIG. 8

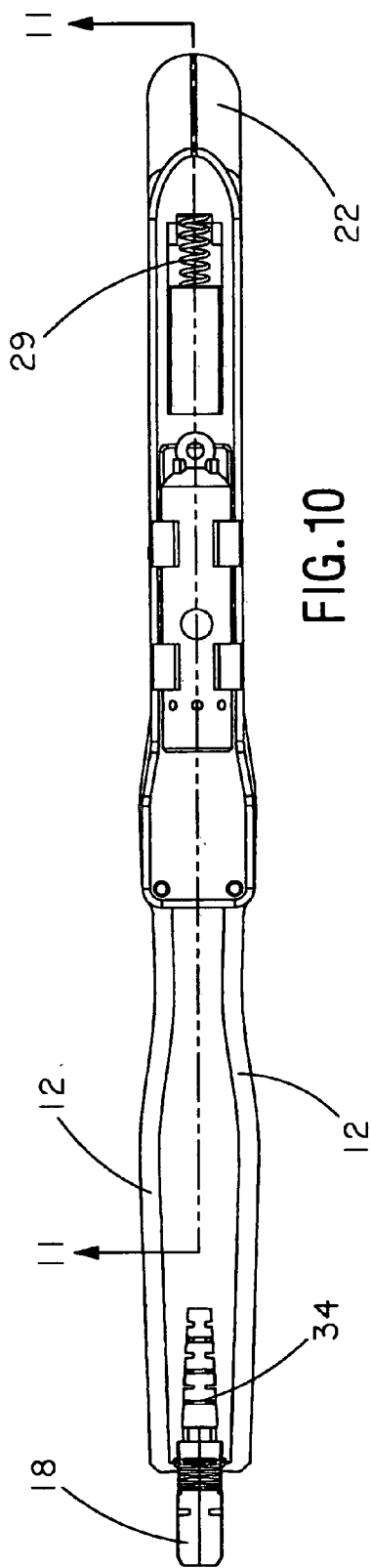
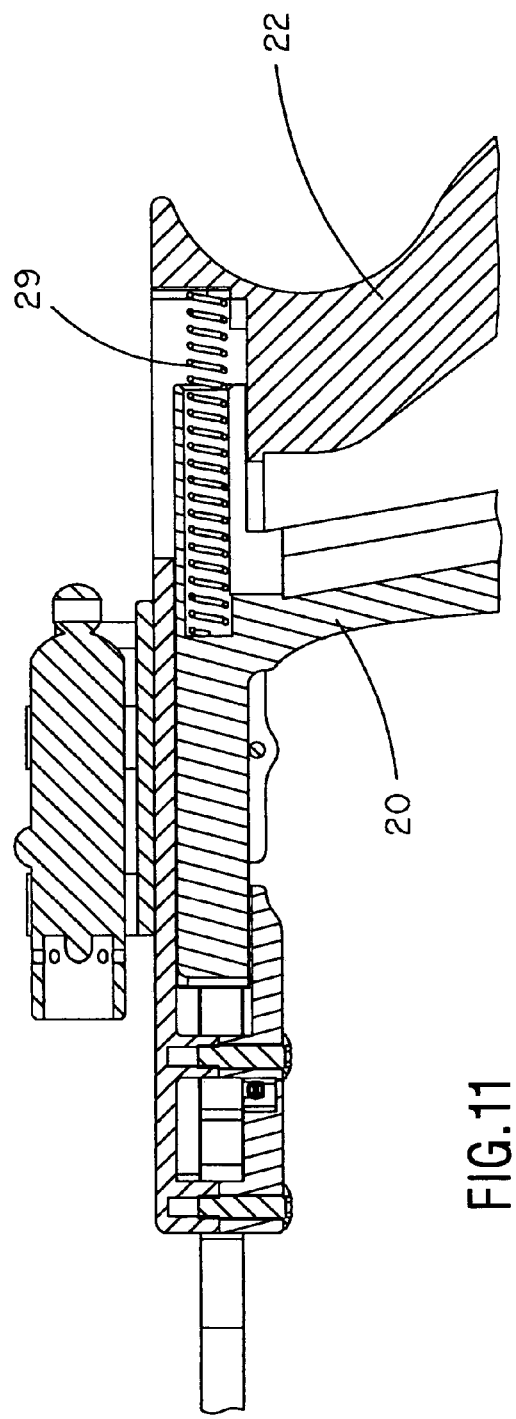
FIG.10
FIG.11

FIBER OPTIC CONNECTOR REMOVAL TOOL

CROSS-REFERENCE TO RELATED APPLICATION

This application claims the benefit of U.S. Provisional Applications Nos. 60/467,297, filed May 2, 2003; 60/483,492, filed Jun. 27, 2003; and 60/497,389, filed Aug. 22, 2003.

BACKGROUND OF THE INVENTION

Fiber optic networks, renowned for their superior data transfer rates, are becoming increasingly commonplace within all sorts of businesses, and are often found in telecommunication centers. As such communication systems continue to proliferate, with larger and denser network configurations increasingly required, the ability to efficiently reconfigure these systems by disconnecting and reconnecting various fiber optic cables and connectors becomes paramount, yet increasingly difficult. A key objective in designing a network is to strategically place most or all of the routing-determinative connective hardware within a single location so as to increase the efficiency of reconfiguring routing and communications connections. This purpose is being significantly thwarted by the exponential growth in the number of cord connections between respective patch panels, communications switches, equipment, etc., to maintain appropriate network functionality. As the connectors have become increasingly densely situated on the patch panels, they have become more and more difficult to manually insert and remove without making harmful contact with adjacent connectors and cables. For example, harmful contact may cause microbends or other irregularities in the glass cores of the respective fiber optic cables, and may thereby damage them such that signal degradation may occur when signals pass over the deformations. Thus, it is desirable to provide a tool for easily inserting and removing connectors. Preferably, such a tool will decrease the chances of harmful contact with nearby cables.

SUMMARY OF THE INVENTION

Some embodiments of the present invention pertain to tools for removing connectors from high-density fiber optic applications, and more particularly to a tool having pivotable arms with cooperative gripping ends for facilitating the gripping, removal and/or insertion of fiber optic connectors into appropriate ports or adapters.

According to one embodiment of the present invention, a tool has a trigger adapted for movement toward a tool handle. Movement of the trigger toward the handle causes a camming interaction between a jaw closure cam and cam arms of jaws, urging gripping ends of the jaws toward each other to grip a connector.

According to some embodiments of the present invention, a connector insertion and removal tool comprises a ratchet mechanism that allows the maintenance of gripping force between gripping ends of jaws without the requirement of continued exertion of force by a user. The gripping force may be released by movement of a trigger to an end position followed by release of the trigger, or by activation of a release lever.

Jaws and gripping ends of the present invention may be swappable, allowing users to select a proper jaw or gripping end for a particular connector insertion or removal task.

BRIEF DESCRIPTION OF FIGURES

FIG. 5 is a right side elevational view of the tool of FIG. 1;

FIG. 6 is an upper plan view of the tool of FIG. 1;

FIG. 7 is a cross-sectional view of the tool of FIG. 1 taken along the line 7—7 in FIG. 6;

FIG. 8 is a partial bottom plan view of the tool of FIG. 1;

FIG. 10 is an upper plan view of the tool of FIG. 9;

FIG. 11 is a cross-sectional view of the tool of FIG. 9 taken along the line 11—11 in FIG. 10;

DETAILED DESCRIPTION OF PREFERRED EMBODIMENTS

This patent application incorporates by reference U.S. Provisional Patent Applications Ser. Nos. 60/467,297; 60/483,492; and 60/497,389 in their entireties.

The invention pertains to tools for removing connectors in, for example, high-density fiber optic applications, and more particularly to a tool having pivotable arms having cooperative gripping ends for facilitating the gripping, removal and/or insertion of fiber optic connectors into appropriate ports or adapters.

In the illustrated designs, the tool is particularly adapted for removing an SC or LC fiber optic connector using a pair of jaws with angled tips for secure handling of the connector. High-density connections make it difficult for an operator to unlatch and remove fiber optic connectors from an adapter without causing damage to the fiber optic core or interference to adjacent connectors. Some embodiments of tools according to the present invention slide over any cabling to grab and remove a connector from its socket without damaging any components or interfering with adjacent connectors.

Figure 1:
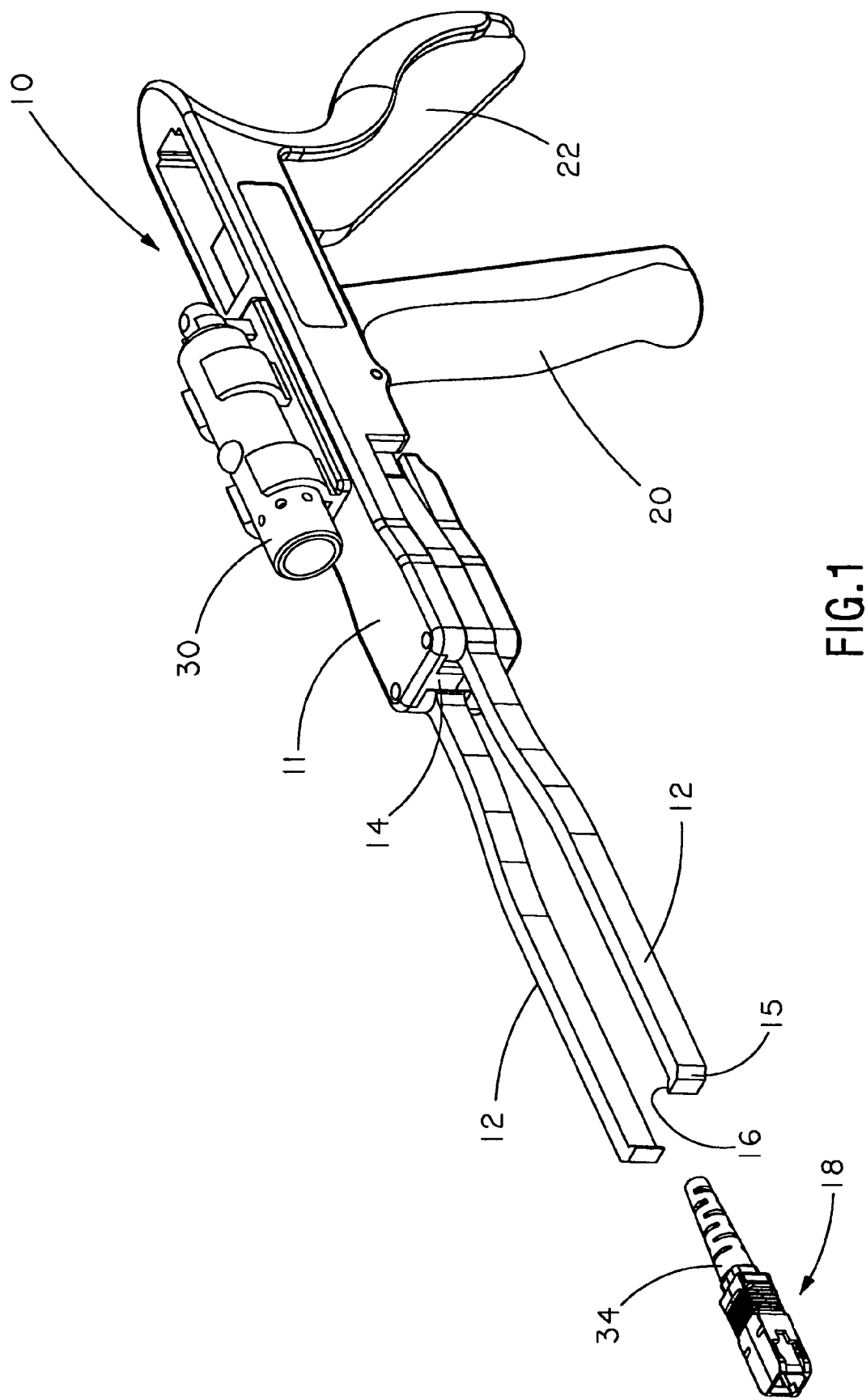
FIG. 1 is a front upper right perspective view of a tool in accordance with an embodiment of the invention.
Figure 2:
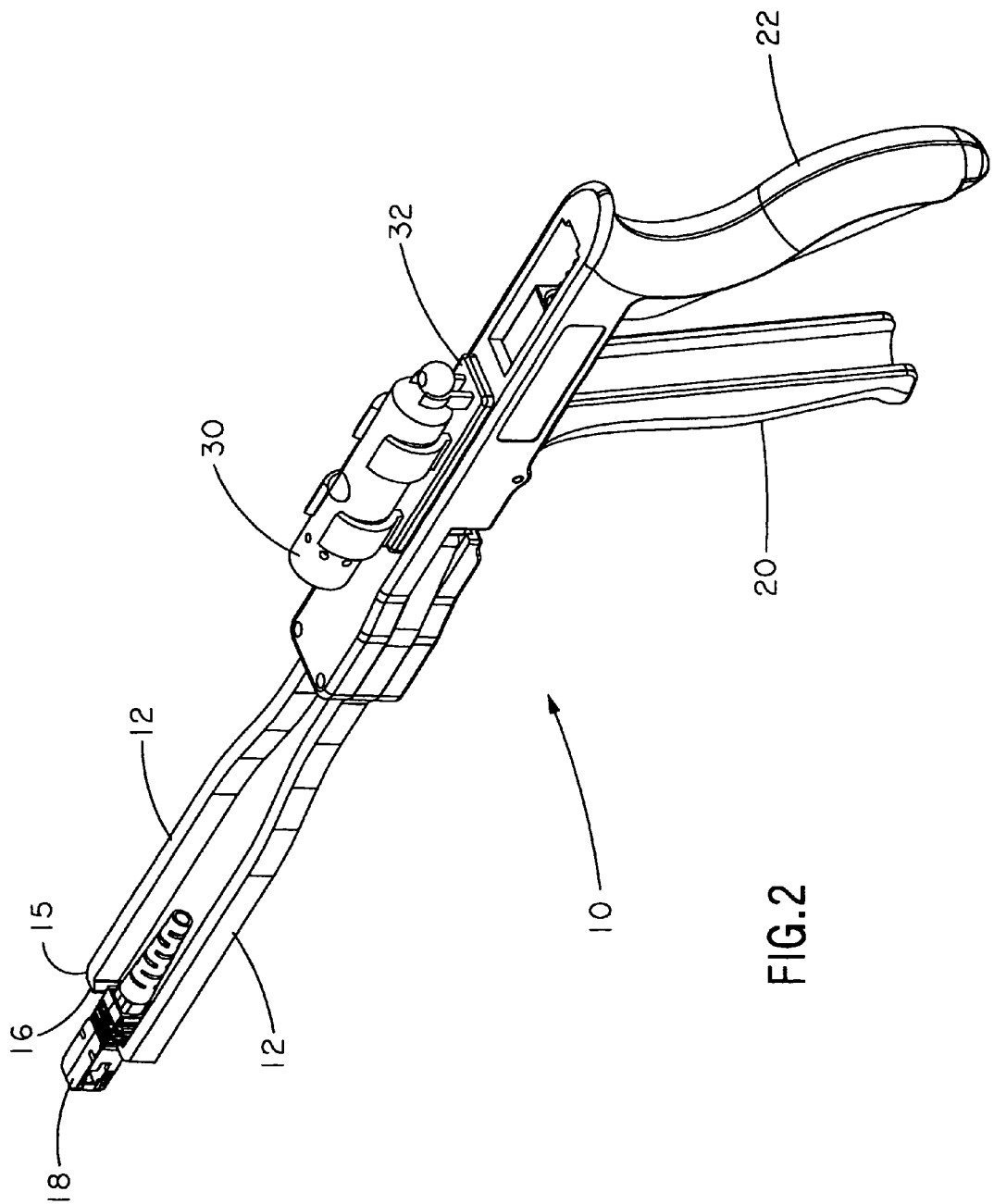
FIG. 2 is a rear upper right perspective view of the tool of FIG. 1.
Figure 3:
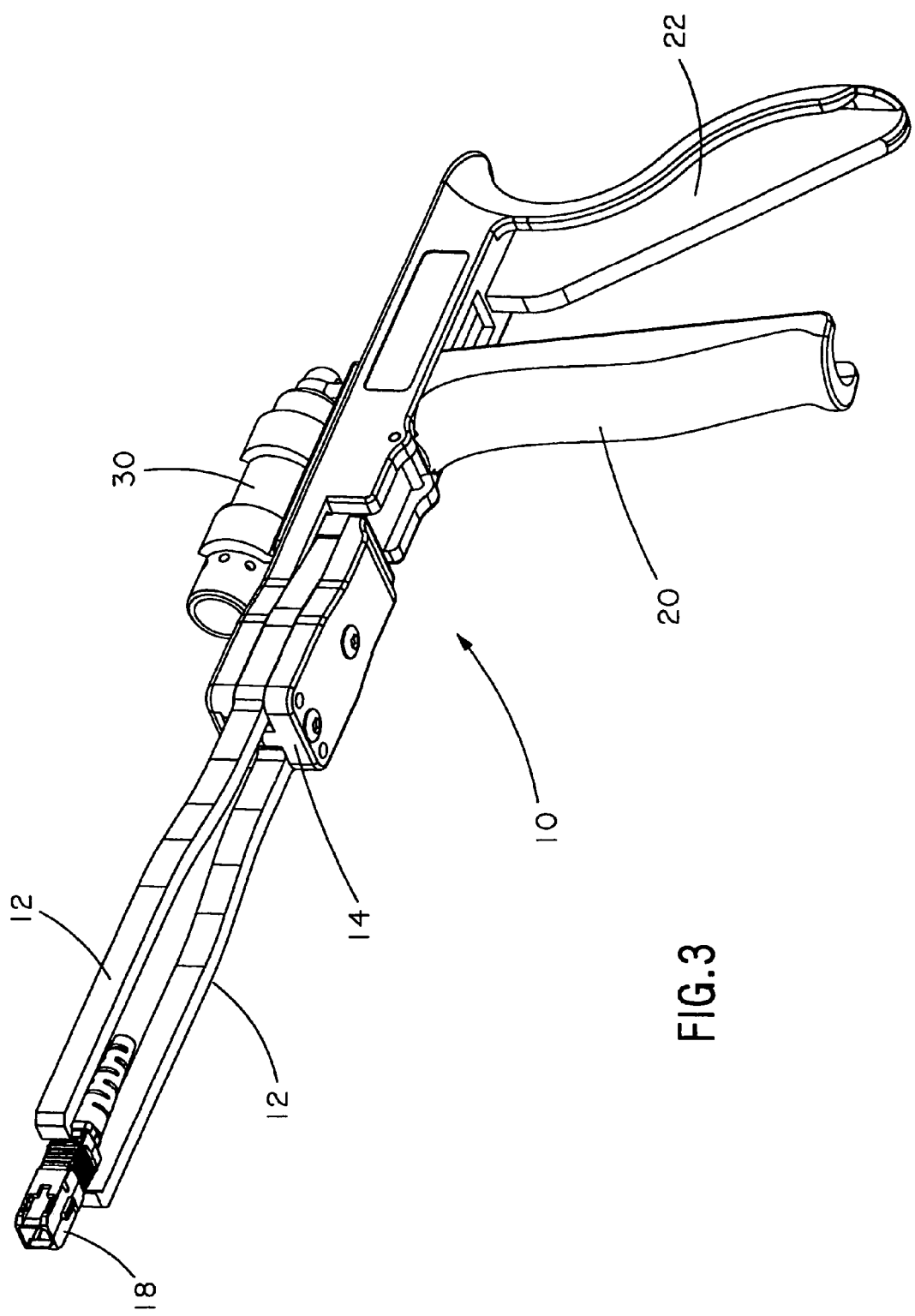
FIG. 3 is a front lower right perspective view of the tool of FIG. 1.
Figure 4:
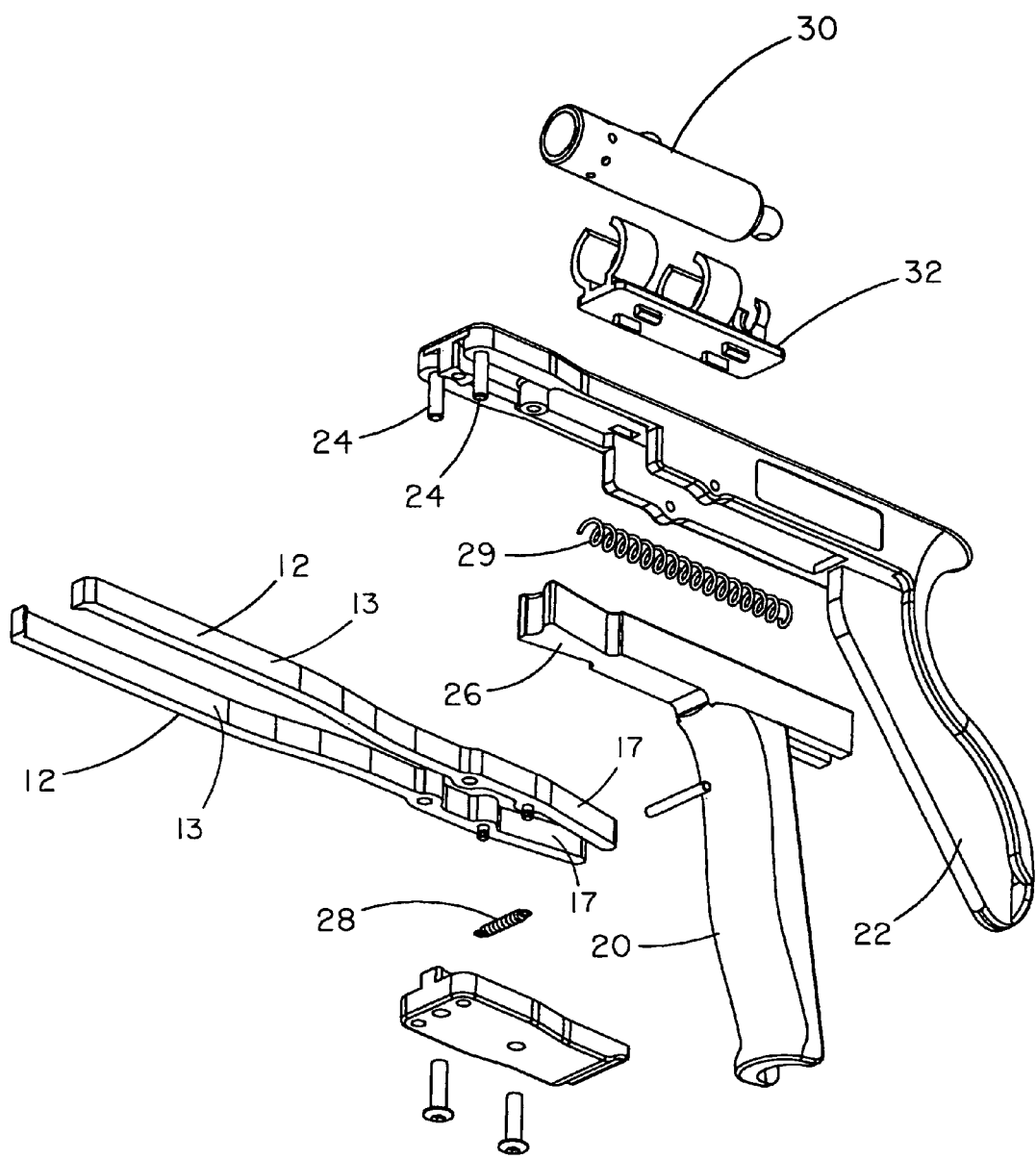
FIG. 4 is an exploded front lower right perspective view of the tool of FIG. 1.
Figure 9:
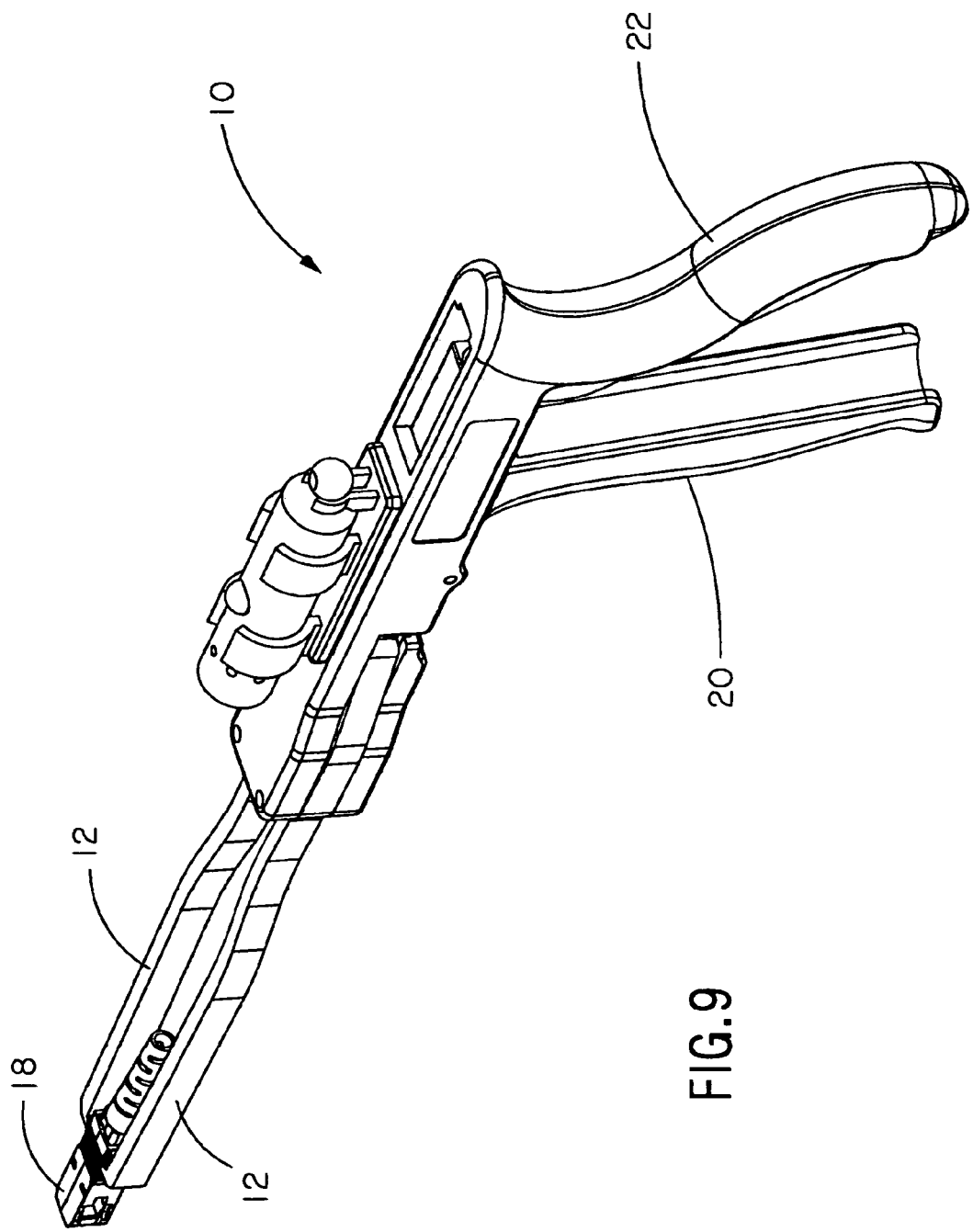
FIG. 9 is a rear upper right perspective view of the tool of FIG. 1 wherein the tool is gripping a connector.
Figure 12:
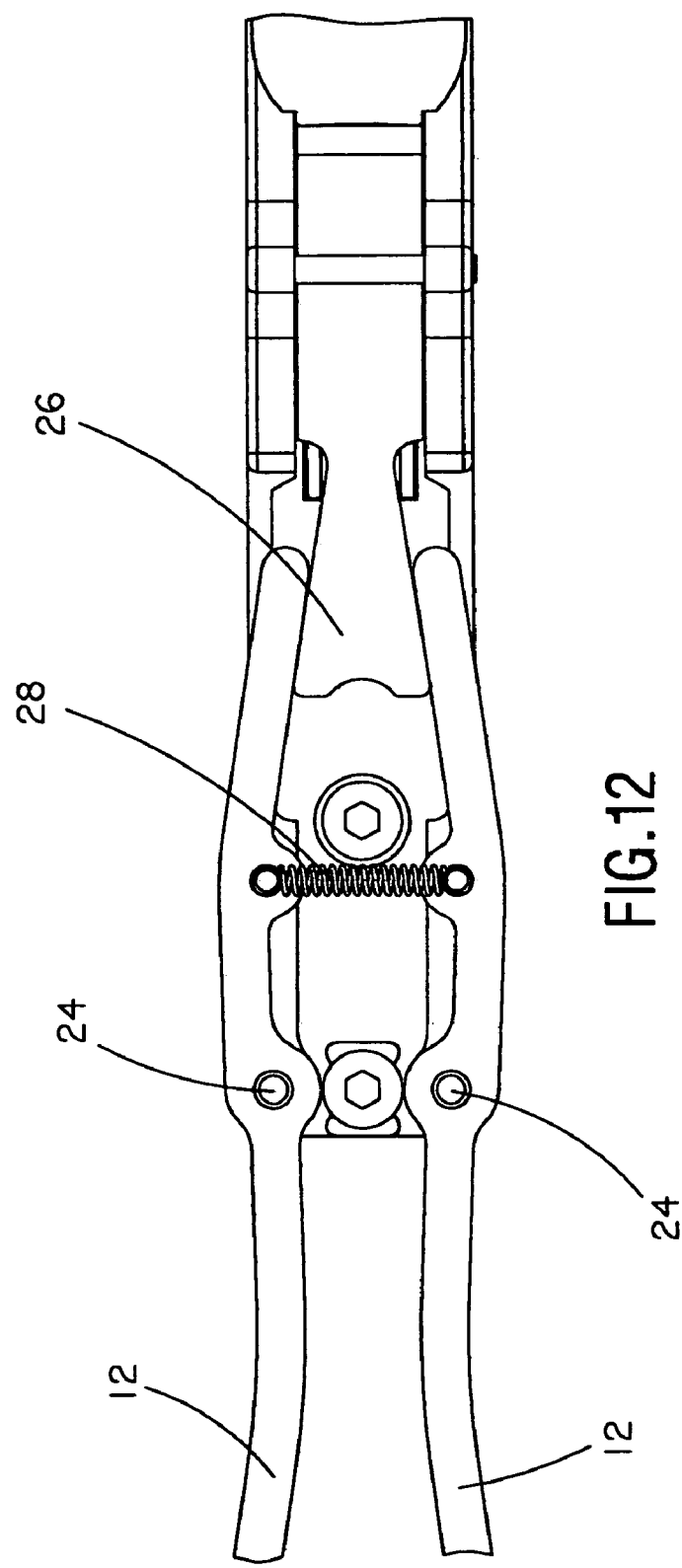
FIG. 12 is a partial bottom plan view of the tool of FIG. 9.

In a first preferred embodiment, and as seen in FIGS. 1–8, the tool 10 includes two long jaws 12 that extend from the front 14 of the tool housing 11 and have angled tips 16 on the ends thereof to facilitate grabbing the body of the connector 18, such as an SC connector, while avoiding catching on cables passing in front of the connector when the connector has been removed. The space between the jaws facilitates this type of engagement. When the trigger 20 and handle 22 of the tool are squeezed together, the ends of the jaws come together to compressibly grasp the connector body. After the tool grabs the connector body, the tool is pulled in a rearward motion to remove the connector body from its adapter. As shown in FIG. 4, a pair of jaw pivots 24, a jaw closure cam 26, and a jaw return spring 28 are used to bias the jaws into an open position. The jaws 12 comprise gripping arms 13 and cam arms 17 and may be closed by exertion of compressive manual pressure between the ergonomic and cooperative trigger 20 and handle 22 of the gun-shaped tool. An additional spring 29 may preferably be employed to bias the trigger 20 away from the handle 22 so that the handle returns to its initial position after manual compression between them is released. When the trigger 20 and the handle 22 are squeezed together, as seen in FIGS. 9–12, a connector may be grabbed such that it may be removed from or inserted into an adapter or other socket.

As seen in the illustrated embodiment, the tool may include an optional light 30 mounted by mounting piece 32 thereon (shown in FIG. 2) for illuminating the region of the socket or adapter that is receiving an inserted connector or that a connector is being withdrawn from. This illumination permits the operator to more easily view and accomplish the removal or insertion task. In a preferred embodiment of the invention, the light is an LED.

Thus, in operation, one selects a connector for removal from an adapter, for example, places the open jaws over any cabling to straddle the selected connector with the tips of the jaws, and squeezes the trigger and handle to grab the connector and remove it from the adapter.

A preferred embodiment of the invention includes a pistol-style grip that facilitates the grasping or clamping action of the jaws. A feature of the instant invention is that it may preferably include angled lead-outs 15 on the tips such that they do not catch on fiber cables disposed in front of a connector or strip the insulation or buffer off such a cable or wire. Another feature of the instant invention is that the instant invention may avoid applying stress to the rubber boot 34 (shown in FIG. 1) at the junction of a fiber optic cable and its end connector. Such stress has the potential to hurt the fiber optic connection. The instant invention also has the additional optional advantage of being symmetric, therefore causing no significant moments or torques that would make the tool difficult to use and would increase the chance of the tool rotating into contact with adjacent connectors and/or fiber optic cables.

Figure 13:
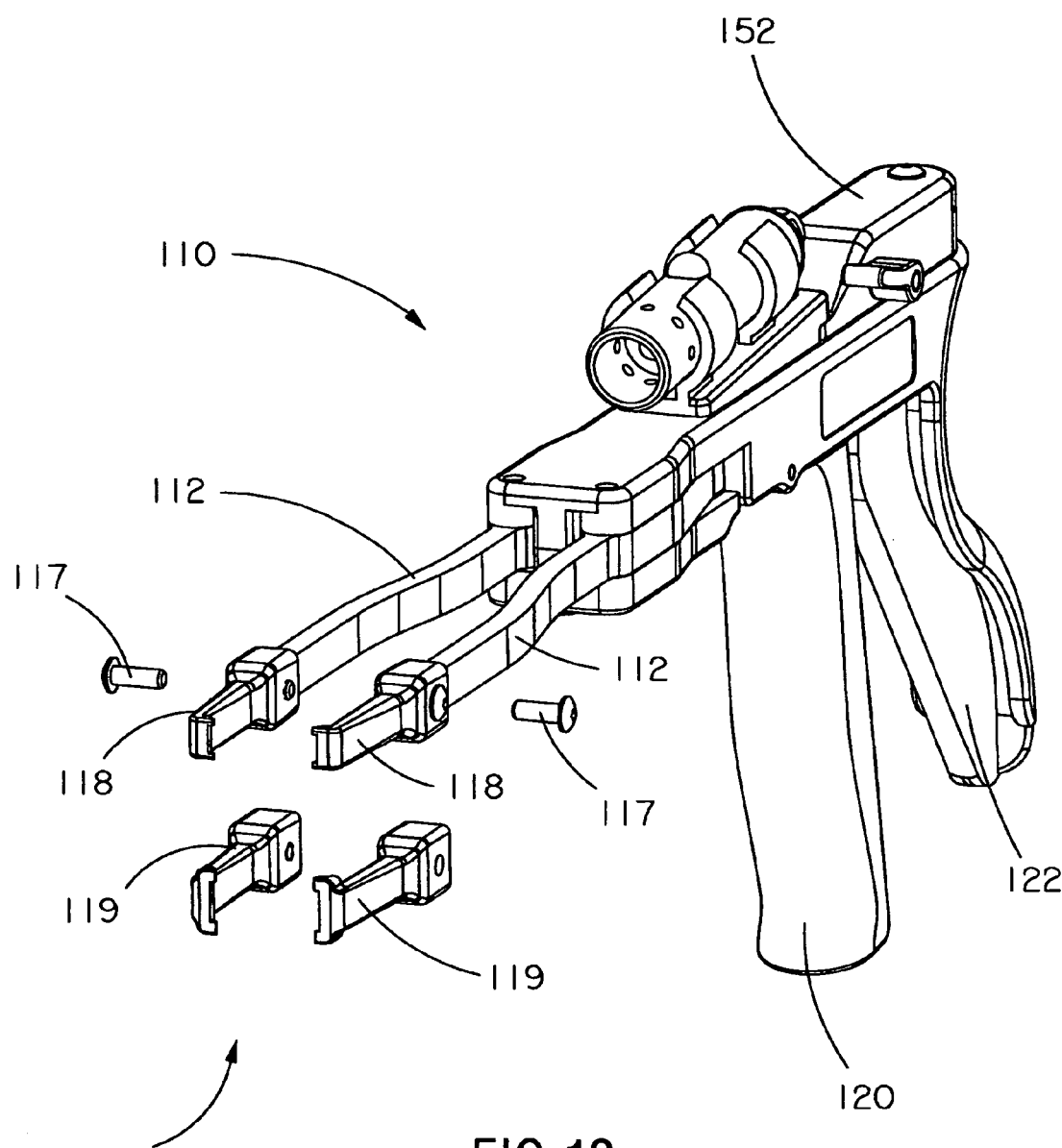
FIG. 13 is a front upper right perspective view of a tool in accordance with an alternative embodiment of the invention wherein the jaws of the tool are open.
Figure 14:
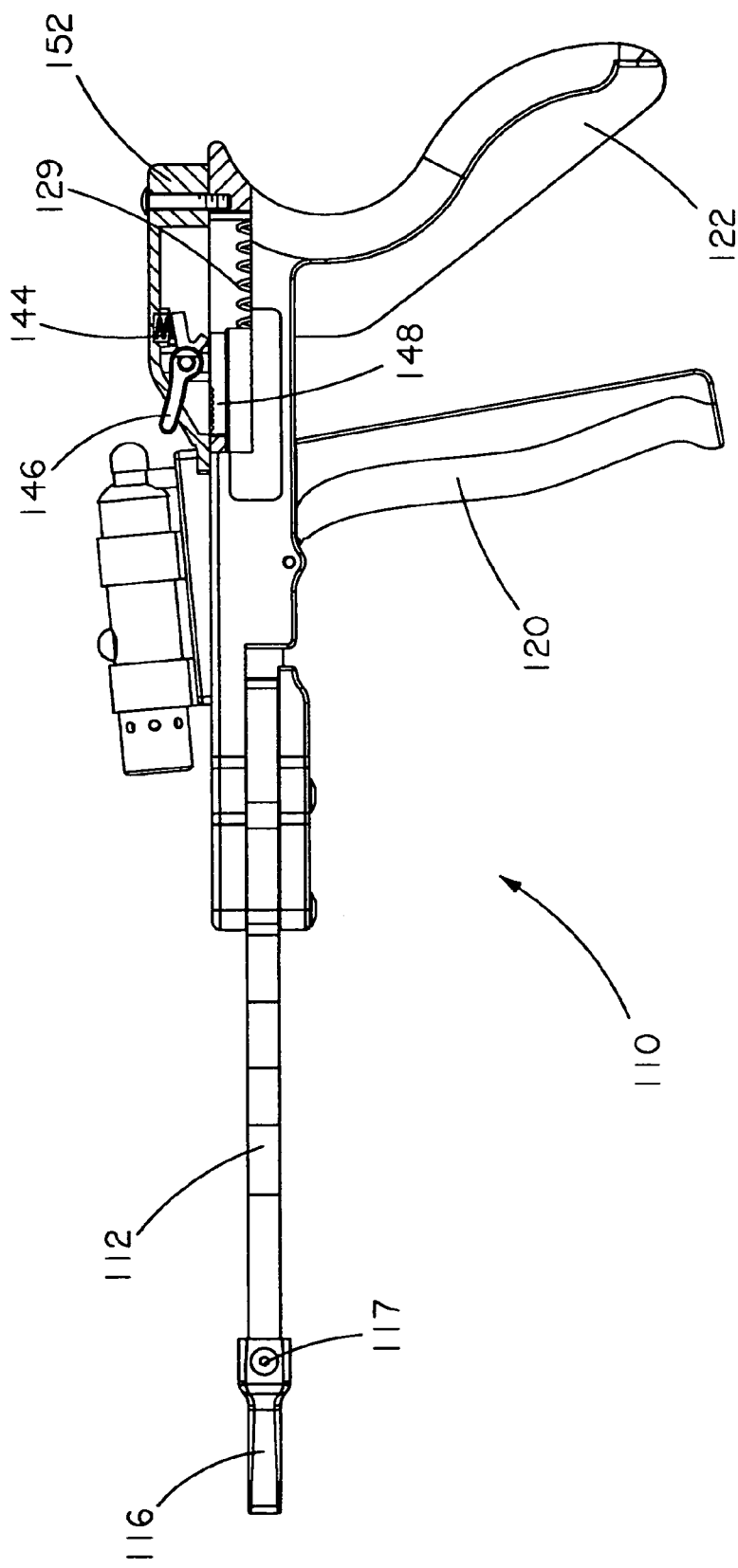
FIG. 14 is a right side elevational view of the tool of FIG. 13 with a section broken away to permit the viewing of interior parts.

In an alternate preferred embodiment of the invention, shown in FIG. 13, instead of the angled tips 16 of the previously described embodiment(s), the tool 110 includes interchangeable tip extensions 116 (shown in FIG. 14) that are removably attachable to the remote ends of the jaws 112. The tip extensions 116 may be held on the jaws by pins 117 extending therethrough. Having differently configured tip extensions 116 provides flexibility in handling differently formatted connectors, possibly in differently configured systems. For example, if the connector is configured to meet LC, FJ, ST, or another format, instead of the SC format shown in the prior embodiments, the tool 110 could still be used if cooperatively configured tip extensions 116 were removably attached to the jaws 112. Based on differences in the existence, location, and shape of latches, for example, the different tip extensions would preferably be configured to interact with any latching apparatus on such connectors, as well as to provide the tool a firm, but releasable, grip on the connectors. The embodiment shown in FIGS. 13–22 shows particular tip extensions 118 that preferably are cooperative with an LC-style connector and tip extensions 119 that preferably are cooperative with an SC-style connector.

Figure 15:
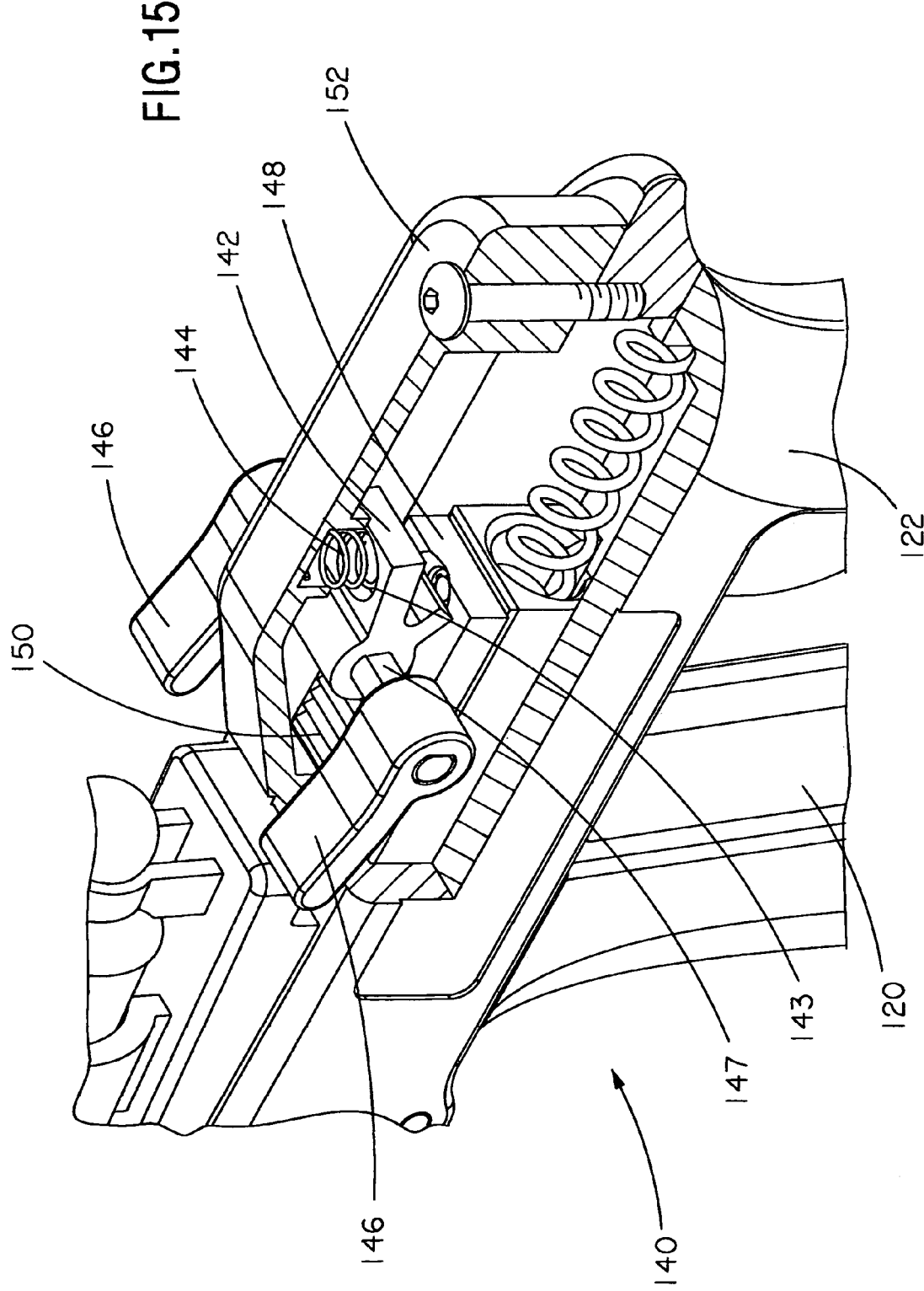
FIG. 15 is a rear upper right perspective view of a portion of the broken-away tool of FIG. 14.
Figure 16:
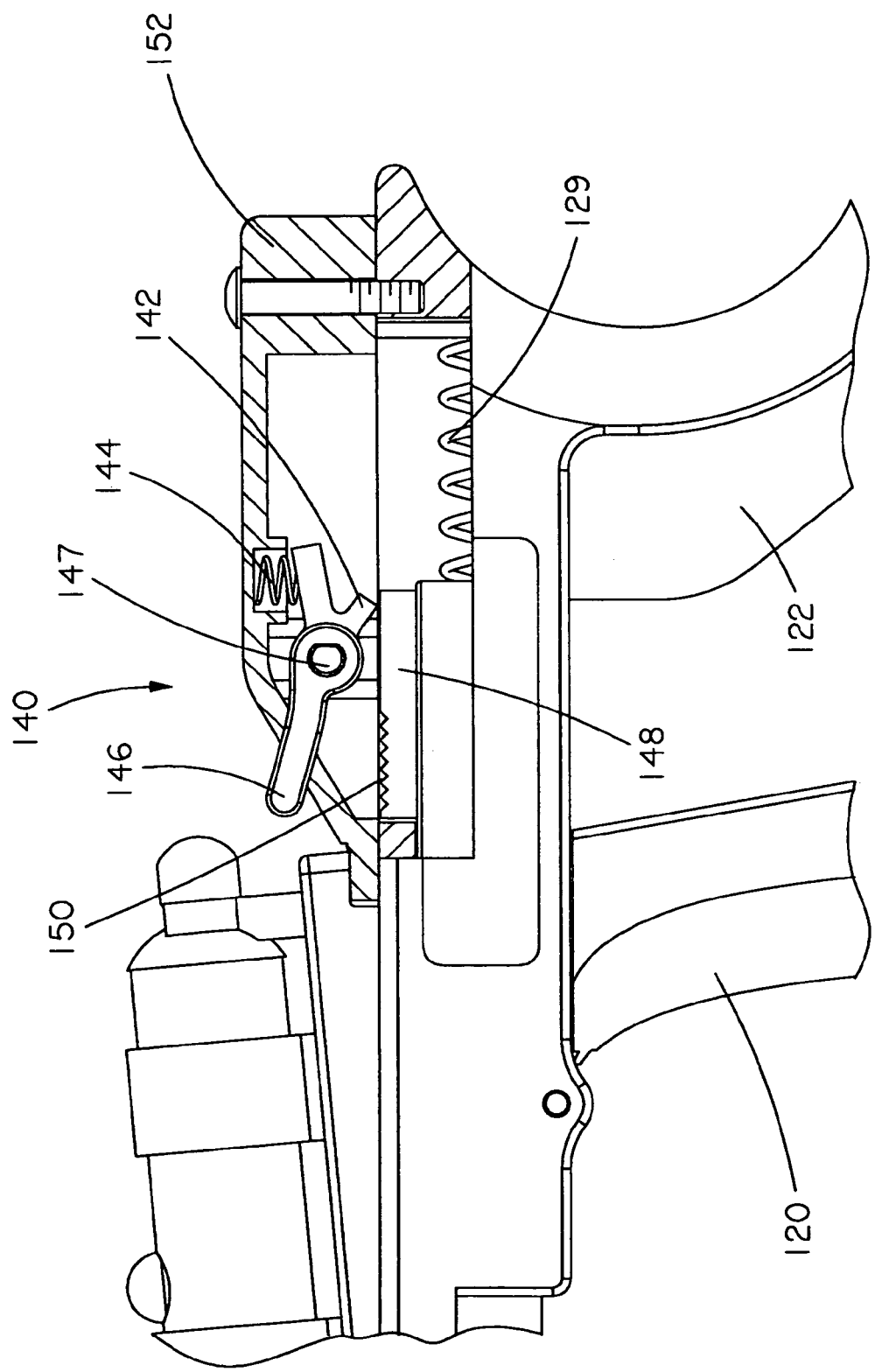
FIG. 16 is a right side elevational view of a portion of the broken-away tool of FIG. 14 when the jaws of the tool are open.
Figure 17:
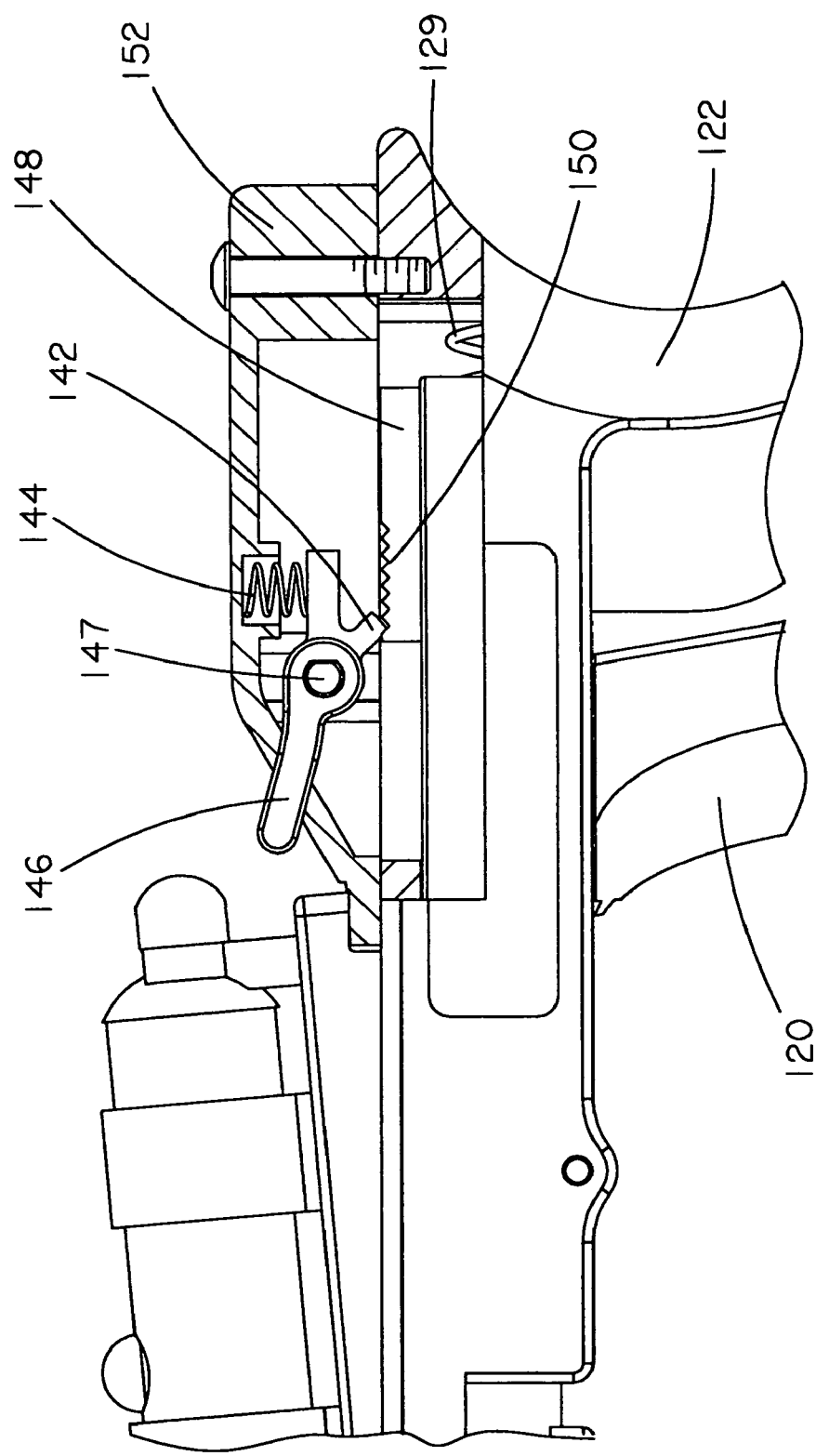
FIG. 17 is a right side elevational view of a portion of the broken-away tool of FIG. 14 wherein the jaws of the tool are closed.
Figure 18:
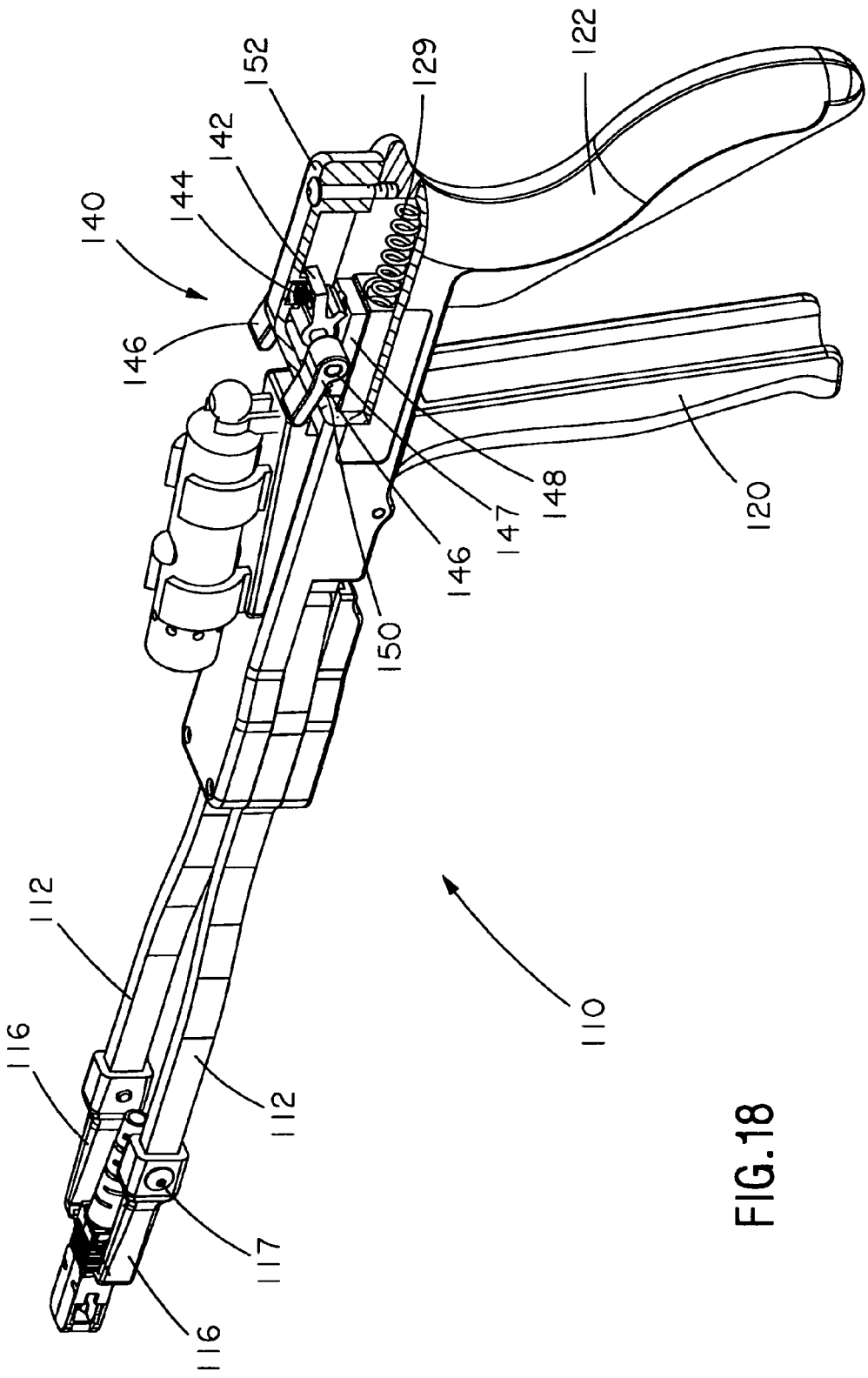
FIG. 18 is a rear upper right perspective view of the broken-away tool of FIG. 14.
Figure 19:
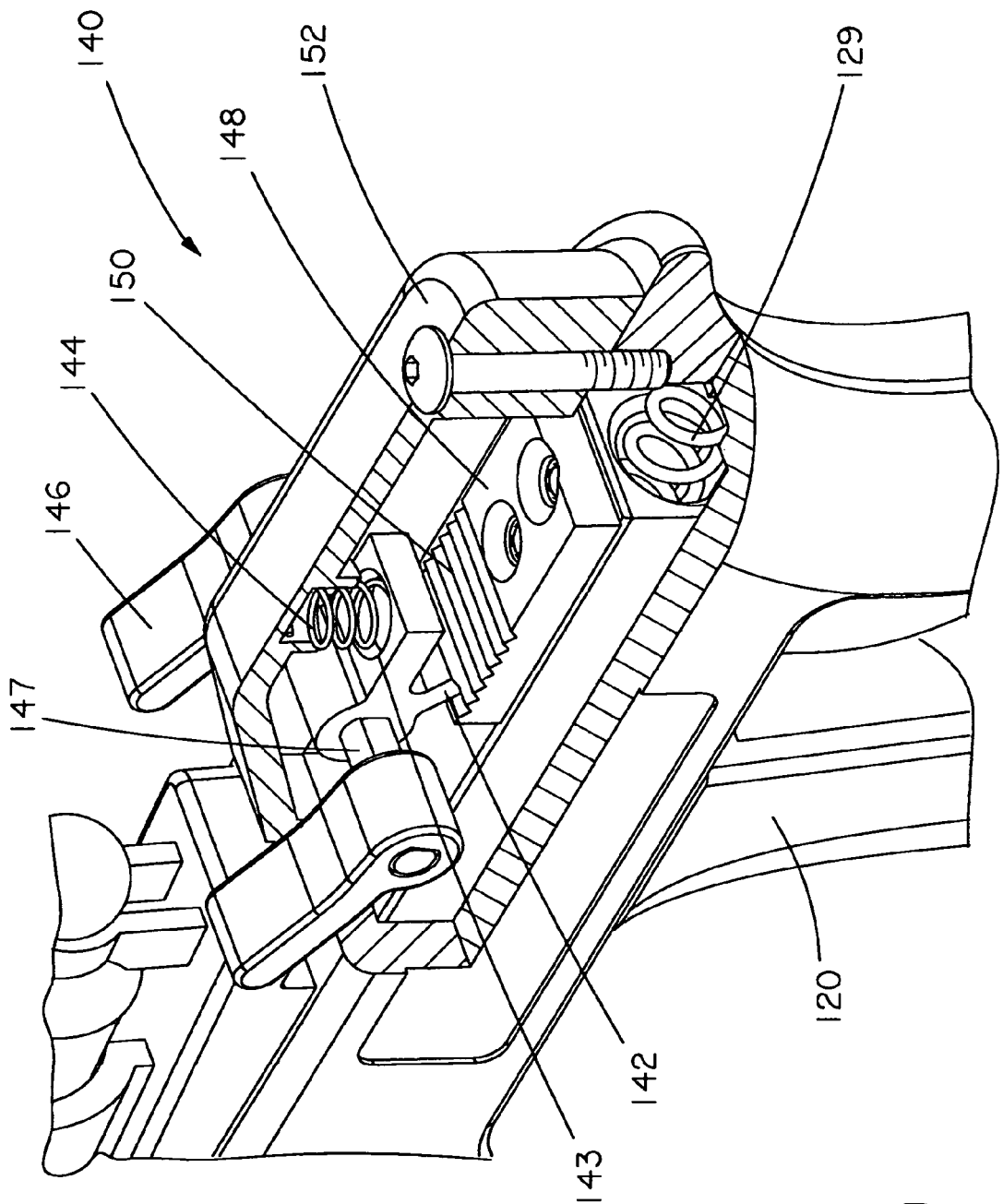
FIG. 19 is a rear upper right perspective view of a portion of the broken-away tool of FIG. 17.
Figure 20:
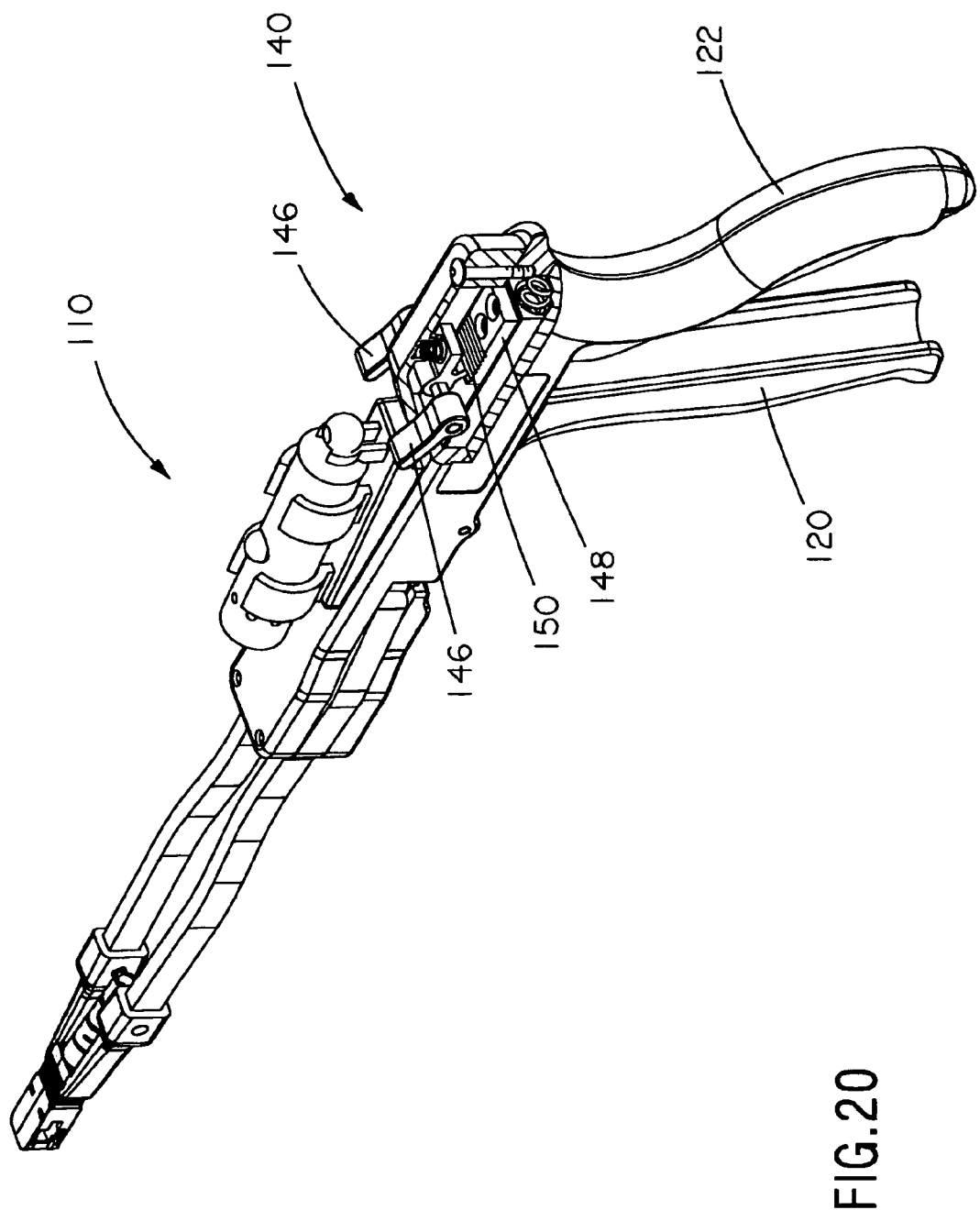
FIG. 20 is a rear upper right perspective view of the broken-away tool of FIG. 17.
Figure 21:
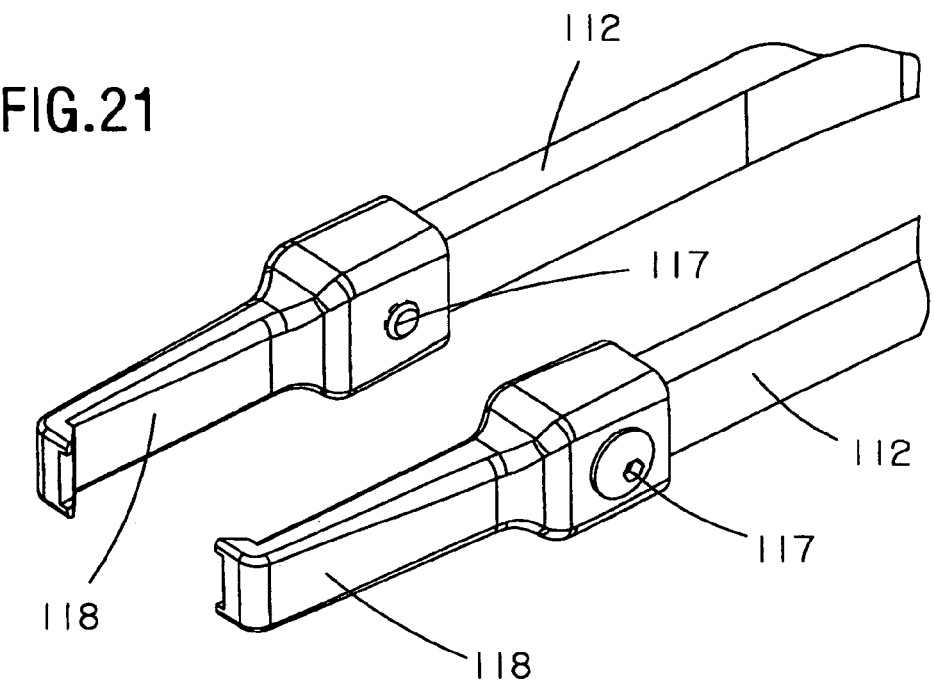
FIG. 21 is a front upper right perspective view of a pair of tip extensions compatible with an LC-style connector in accordance with an embodiment of the invention.
Figure 22:
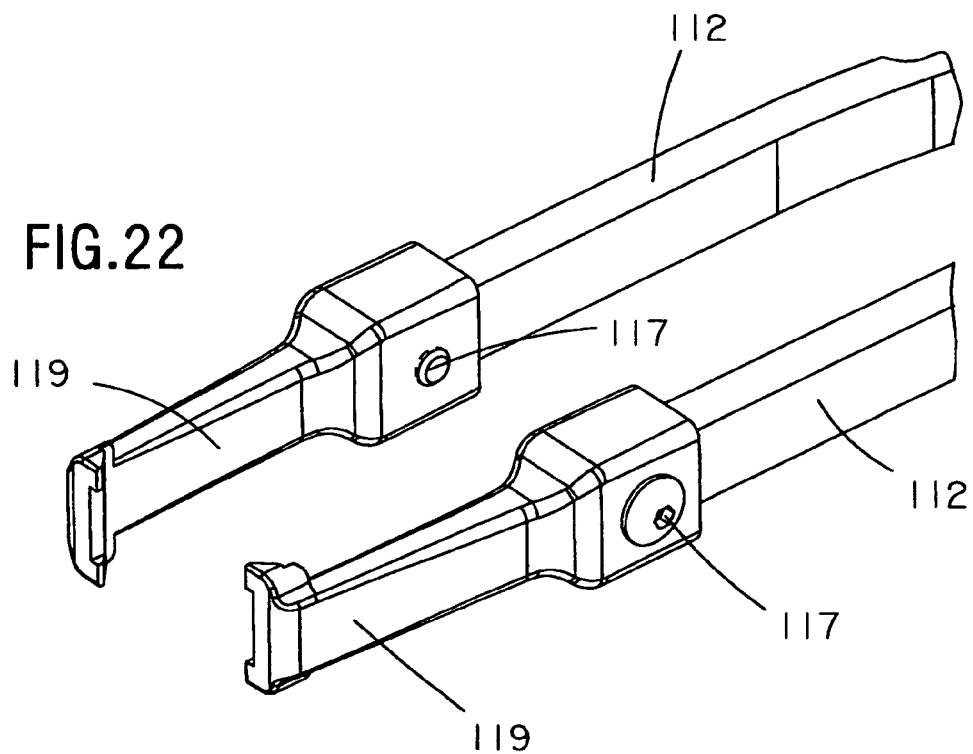
FIG. 22 is a front upper right perspective view of a pair of tip extensions compatible with an SC-style connector in accordance with an embodiment of the invention.
Figure 23:
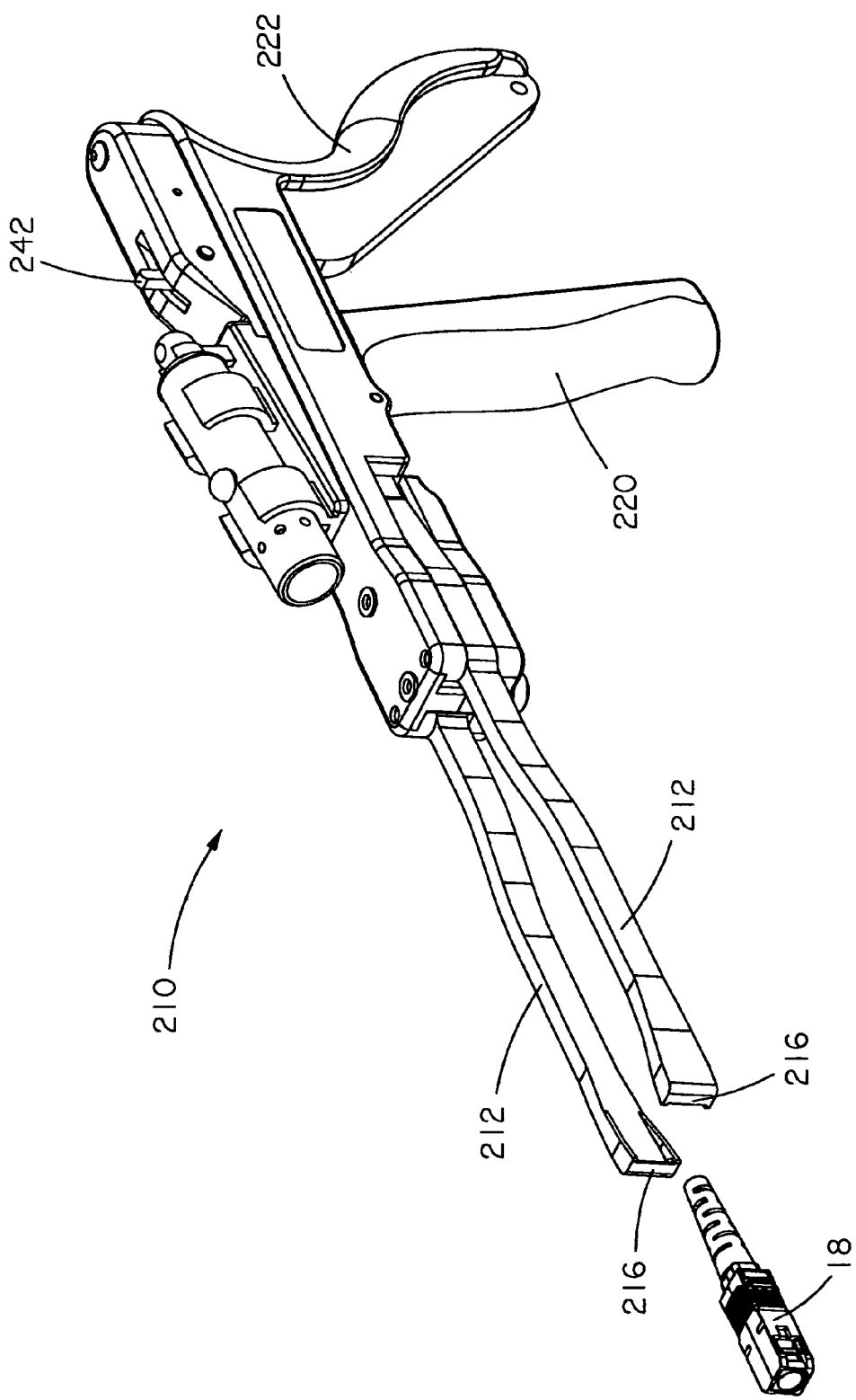
FIG. 23 is a front upper right perspective view of a tool in accordance with a second alternative embodiment of the invention wherein the jaws of the tool are open.
Figure 24:
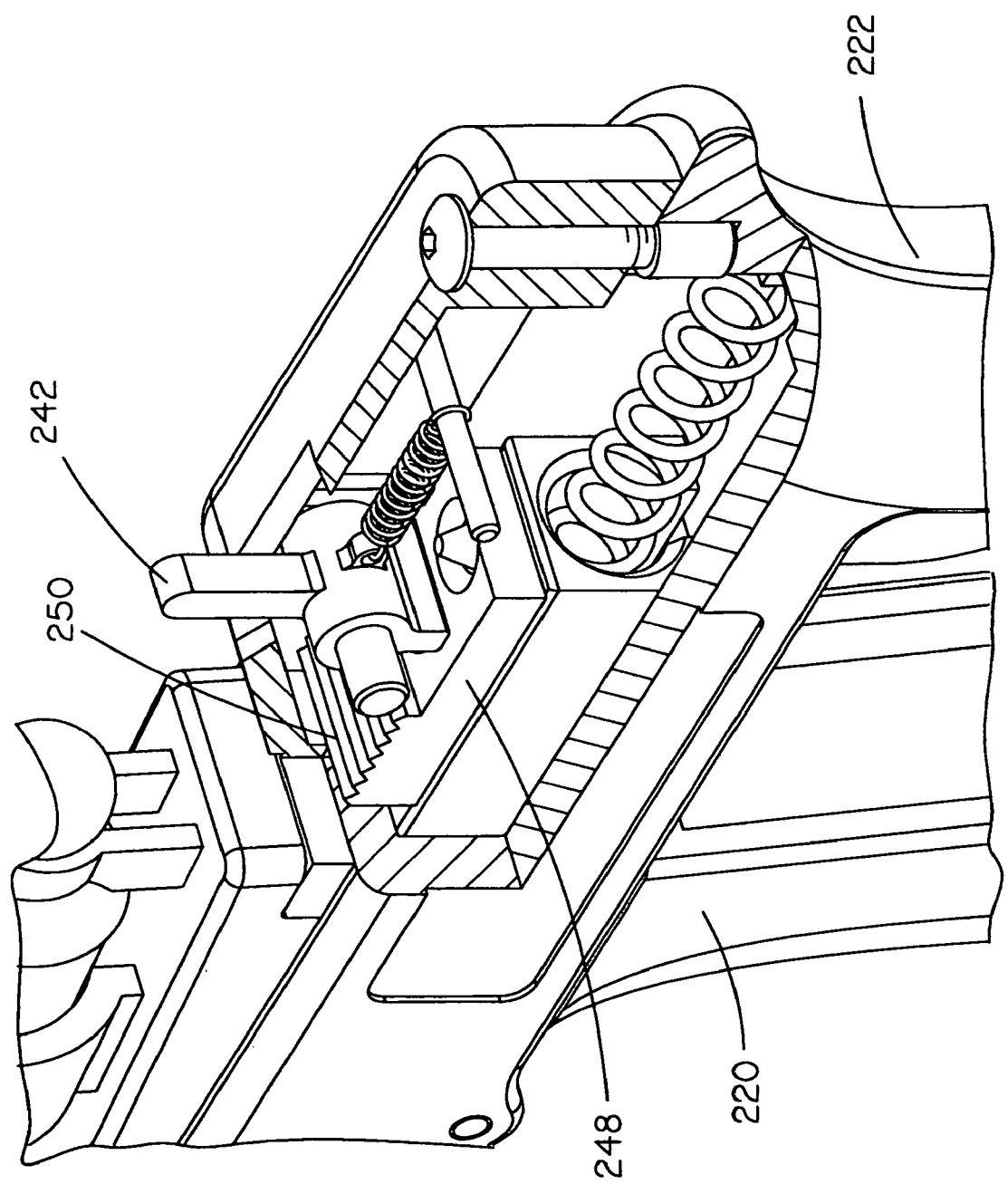
FIG. 24 is a rear upper right perspective view of the tool of FIG. 23 with a section broken away to permit the viewing of interior parts.

Another preferable alternate embodiment of the invention includes a mechanism to maintain compressive pressure on the jaws to hold the connector even after manual compressive pressure is released relative to the trigger 120 and handle 122. The mechanism 140, as shown in FIG. 15, may preferably include a pawl 142, a bias spring 144 that sits in a seat 143 in the pawl, and a pair of release levers 146 attached to an axle 147 through the pawl 142, the pawl cooperating with a sliding rack 148 having ridges 150 thereon. A housing cover 152 preferably retains the assembly 140 and provides backing for the bias spring 144.

Thus, when the tool is being used to grip a connector, either for insertion into a port, removal therefrom, or generally, manually squeezing the trigger 120 against the handle 122 compresses the jaws 112 in like manner as described above with regard to FIGS. 1–8. However, as the trigger is squeezed against the bias of the spring 129, the rack 148 travels toward the rear of the tool until the ridges 150 encounter an edge of the pawl 142. Upon the release of manual pressure on the trigger 120, return travel of the rack 148, as encouraged by return spring 129, is thwarted by the pawl edge digging into a ridge 150 in the rack 148, thereby preventing the release of compression or cam pressure on the closed jaws. In this manner, the compressive grip on the connector may be maintained even after manual pressure on the trigger (relative to the handle) is removed. When such compressive grip is desired to be removed, the operator may simply push either release lever 146 that, via the connecting axle 147, rotates the pawl 142 out of the ridge 150 on the rack 148, thereby permitting the return spring 129 to return the trigger and cammingly re-open the jaws.

In yet another preferred embodiment of the invention, instead of the angled tips 16 of earlier described embodiments, and the differently configured tip extensions 116 of the subsequently described embodiments, a tool 210, shown in FIGS. 23–28, includes interchangeable jaws 212 having differently configured tips 216 on the ends thereof to facilitate grabbing and holding the body of the connector 18. As shown particularly in FIG. 28, the jaws 212 may be substituted for originally described jaws 12 by the removal of thumb screws 225. The interchangeability of the differently tipped jaws provides compatibility with multiple connector configurations.

Figure 25:
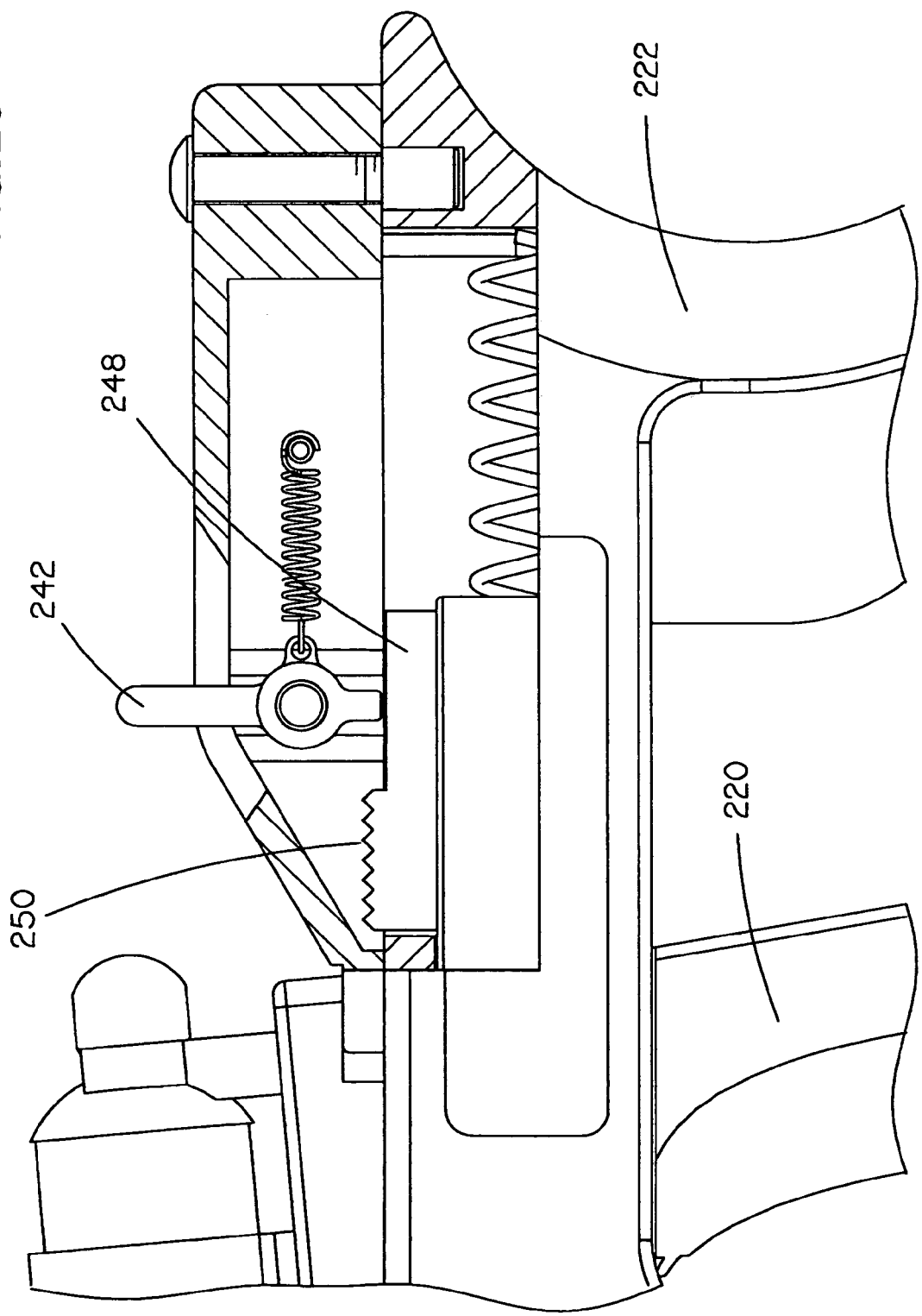
FIG. 25 is a right side elevational view of a portion of the broken-away tool of FIG. 24 wherein the jaws of the tool are open.
Figure 26:
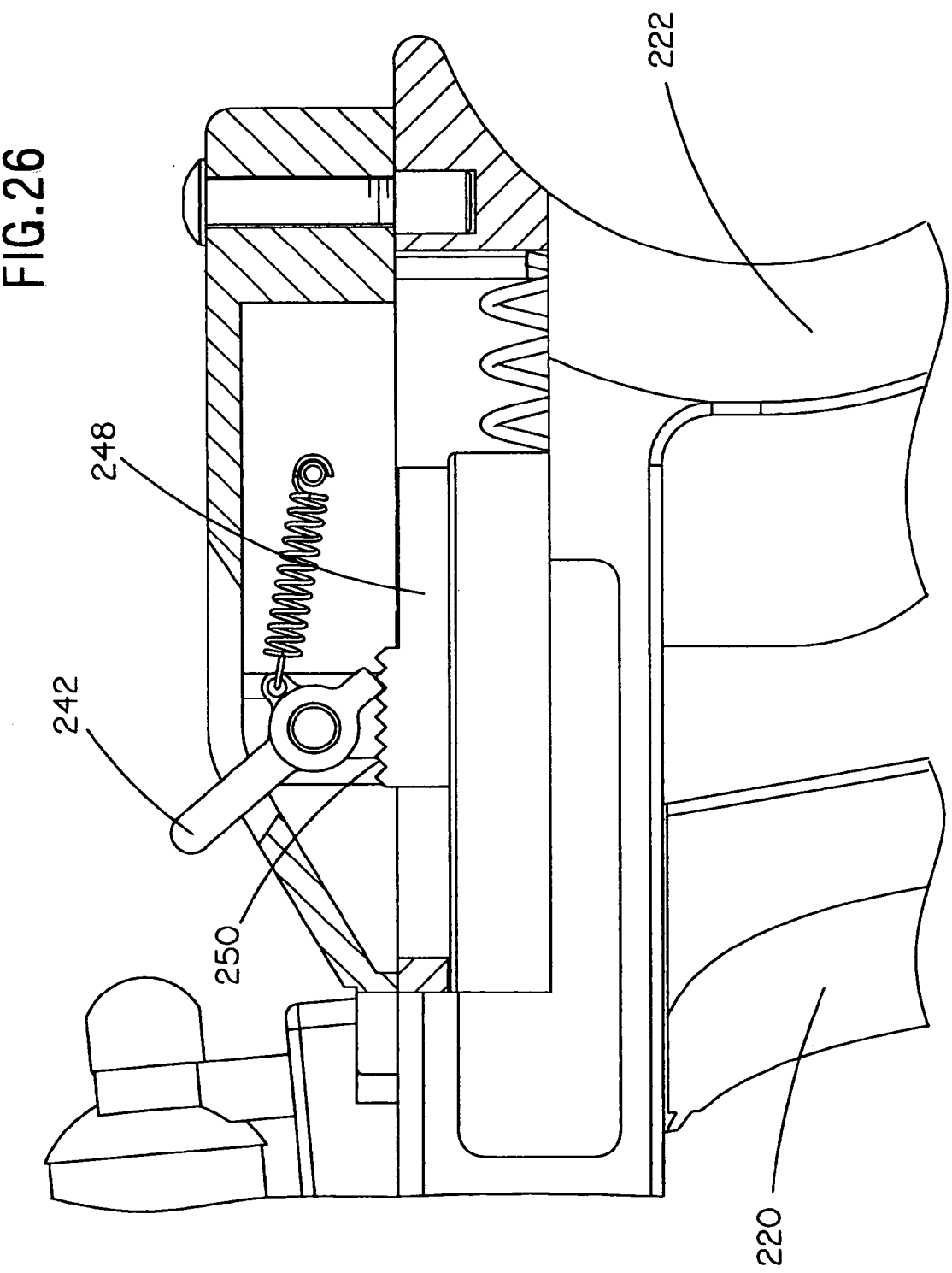
FIG. 26 is a right side elevational view of a portion of the broken-away tool of FIG. 24 wherein the jaws of the tool are closed.
Figure 27:
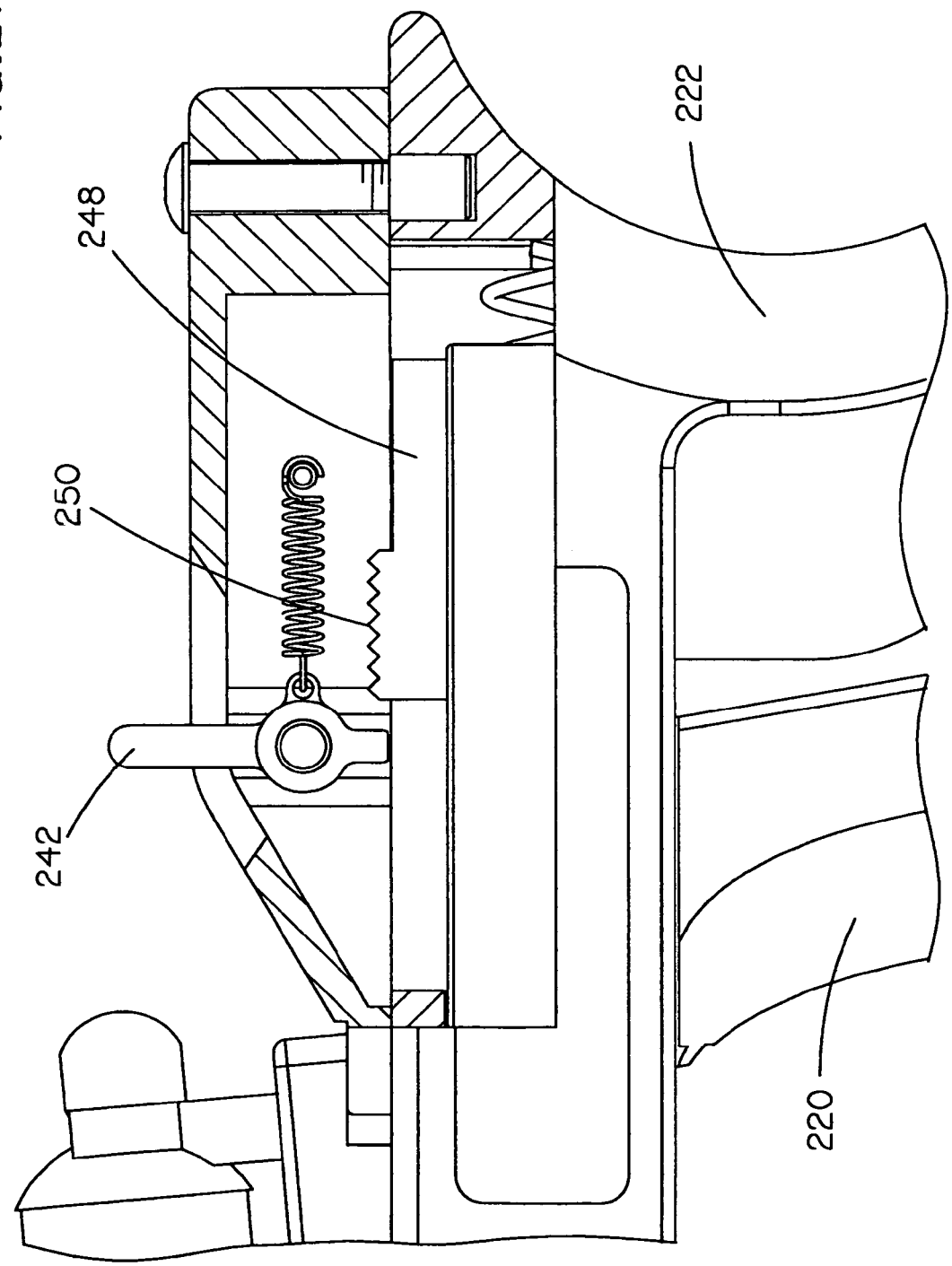
FIG. 27 is a right side elevational view of a portion of the broken-away tool of FIG. 24 wherein the jaws of the tool are released.
Figure 28:
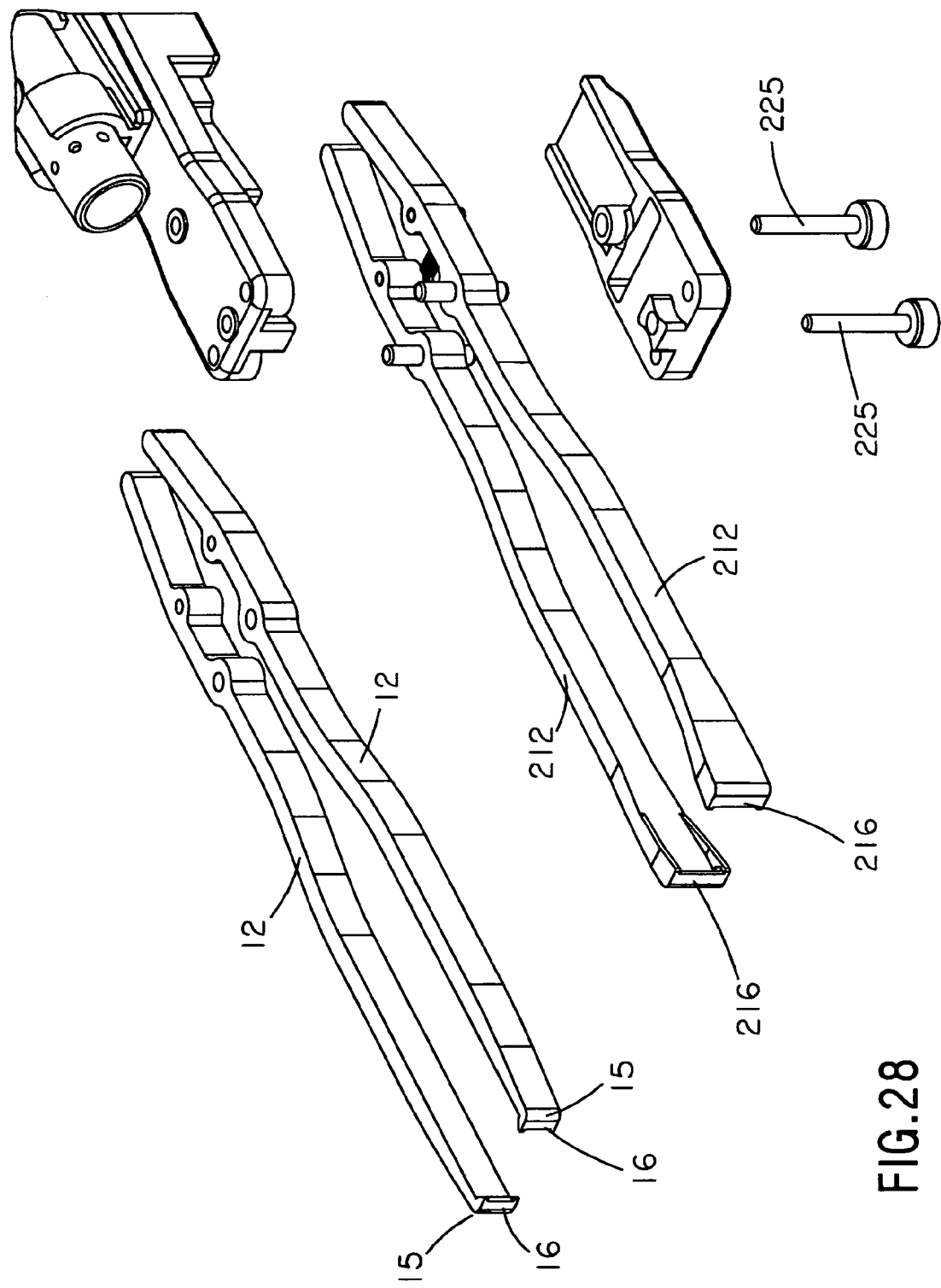
FIG. 28 is a front upper right perspective view of a pair of jaws compatible with connectors of different styles in accordance with an embodiment of the invention.
Figure 29:
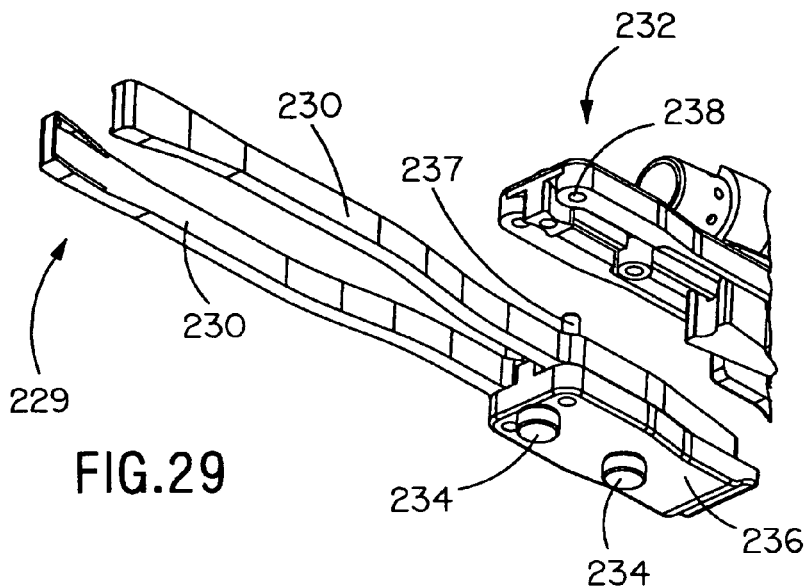
FIG. 29 is a front lower right perspective view of a swappable jaw assembly according to one embodiment of the present invention.
Figure 30:
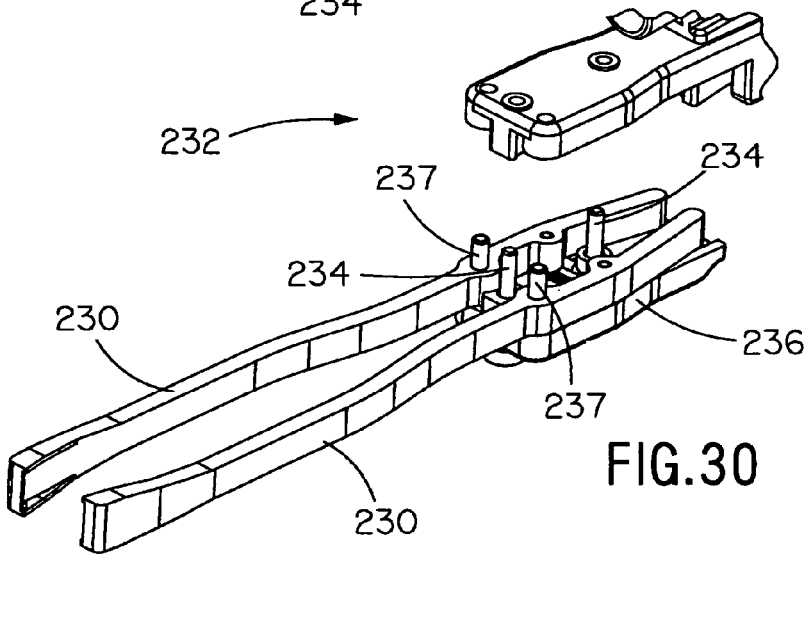
FIG. 30 is a front upper right perspective view of a swappable jaw assembly according to the embodiment of FIG. 29.
Figure 31:
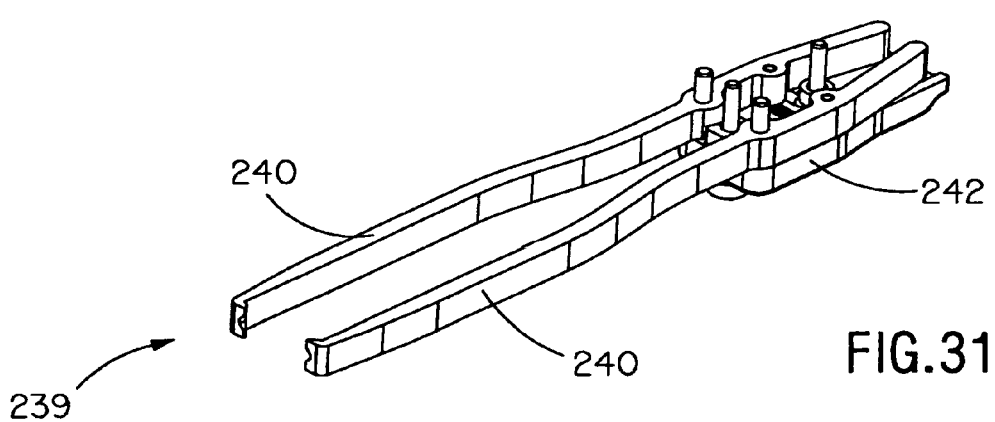
FIG. 31 is a front upper right perspective view of another swappable jaw assembly.

Also shown in the embodiment of FIGS. 23–28 is an alternative mechanism to maintain compressive pressure on the jaws that not only holds the connector even after manual compressive pressure is released relative to the trigger 220 and handle 222, but also has the additional feature that when a greater compressive pressure threshold between the trigger 220 and handle 222 is met, the mechanism releases the compressive pressure on the jaws to release the connector. This embodiment includes a pawl 242 and rack 248 having ridges 250 designed such that when increased compressive pressure is placed between the trigger 220 and handle 222, as shown in FIG. 27, the ridges 250 of the rack 248 slide past the pawl to allow release of the jaw compression on the connector. Specifically, FIG. 25 shows the tool in the open position, i.e., wherein the jaws are not compressed on the connector and no compressive load is placed between the trigger 220 and handle 222. FIG. 26 shows the tool in a closed condition, i.e., wherein the trigger 220 and handle 222 are squeezed together short of the threshold point to effect the closing of the jaws on the connector in a compressive manner to retain the connector there between. FIG. 27 shows the tool in a fully closed condition, i.e., wherein the trigger 220 and handle 222 are compressed beyond a release threshold such that the pawl is free of the ridged rack and jaws release their compressive force on the connector. This permits the operator of the tool to partially squeeze the trigger to effect compression and retention upon the connector, the retention and compression being retained by the mechanism, and then squeeze the trigger harder (beyond a threshold point) to release the connector from the grip of the jaws According to one embodiment of the present invention, jaw assemblies may be swapped to allow easier adaptation of a connector insertion and removal tool for particular types of connectors. FIG. 29 is a perspective view showing a swappable jaw assembly 229. Jaws 230 may be used with a tool housing 232 by attaching the swappable jaw assembly 229 to the tool housing 232 with, for example, thumb screws 234 through a plate 236. Jaw pivots 237 extend through pivot areas of the jaws 230 and into jaw pivot holes 238 provided in the tool housing 232. FIG. 30 is a top perspective view of the swappable jaw assembly 229 of FIG. 29, and FIG. 31 is a top perspective view of a second swappable jaw assembly 239. The second swappable jaw assembly 239 comprises jaws 240 and a plate 242. The first and second swappable jaw assemblies 229 and 239 may be interchanged on the tool housing 232 using, for example, thumb screws, enabling a technician to select the best jaws for a particular connector. It is preferred to supply each swappable jaw assembly with its own thumb screws that are retained in the assembly, facilitating interchanging of the jaw assemblies.

The above-described and illustrated examples of an inventive fiber optic removal tool are exemplary only and in no way should be construed to limit the scope of the invention. For example, the jaws may be relatively rigid, depending upon the required manual trigger pressure and/or the spring constant of the return spring or the jaws may be resilient, flexing to apply compressive grip on the connector. Tools according to the present invention may be designed with different parameters to impart different amounts of force to connectors. For example, in some embodiments tools may be designed to impart from approximately two pounds of force to approximately thirteen pounds of force. The force applied can vary with the gap distance between gripping ends of a tool. For example, in an embodiment adapted for use with LC connectors using universal gripping ends, a force of approximately two pounds may be imparted with a gap distance of 0.19 inch, and a force of approximately six pounds may be imparted with a gap distance of 0.34 inch. In another embodiment adapted for use with SC connectors using wider gripping ends, a force of approximately 7.5 pounds may be imparted with a gap distance of 0.19 inch and a force of approximately ten pounds may be imparted with a gap distance of 0.34 inch. According to other embodiments of the present invention, wider or narrower ranges of forces may be applied as required or desired for particular connectors.

In addition, as generally shown and described, it is preferable to provide jaws according to the present invention with features such as contours and angled lead-outs to facilitate the guiding of the jaws among cables. Such features further facilitate the removal of jaws from a connection jack without snagging or otherwise harming cables.

Various preferred embodiments of the present invention have been described herein. It is to be understood that modifications and changes can be made without departing from the true scope and spirit of the present invention, as defined by the following claims. For example, while the present invention has been generally described with reference to the removal and insertion of optical connectors, it is to be understood that embodiments of the present invention may be used for the insertion and removal of electrical communication connectors or other types of connectors.

What is claimed is:

1. A connector insertion and removal tool comprising:
   first and second jaws adapted to pivot in a tool housing and extending from a front of the tool housing, said first and second jaws having gripping arms and cam arms;
   a first jaw pivot area disposed between said gripping arm and said cam arm of said first jaw;
   a second jaw pivot area disposed between said gripping arm and said cam arm of said second jaw;
   a trigger adapted to slide within said tool housing, said trigger being adapted for linear movement from a start position toward an end position away from said first and second jaws to effect gripping of a connector between first and second gripping tips respectively located on said gripping arms of said first and second jaws;
   a jaw closure cam activated by movement of said trigger and sliding against said cam arms of said jaws to effect pivoting of said jaws around said jaw pivot areas and thereby to effect movement of said gripping arms of said first and second jaws toward each other upon movement of said and tigger; and a ratchet mechanism maintaining a gripping force on said connector when movement of said trigger is stopped between said start position and said end position.

2. The connector insertion and removal tool of claim 1 further comprising a jaw return spring attached to said cam arms of said first and second jaws and urging said cam arms of said first and second jaws toward each other.

3. The connector insertion and removal tool of claim 1 further comprising a handle rearward of said trigger and a return spring biasing said trigger away from said handle.

4. The connector insertion and removal tool of claim 1 wherein said ratchet mechanism comprises:
- a sliding rack having ridges thereon and moving in concert with said trigger; and
- a pawl biased to ride along said ridges as said trigger is moved from said start position toward said end position and to lock against at least one of said ridges when a force moving said trigger is decreased or removed when said trigger is between said start position and said end position.

5. The connector insertion and removal tool of claim 4 further comprising a release lever adapted to release said pawl from said at least one of said ridges of said sliding rack.

6. The connector insertion and removal tool of claim 4 wherein said pawl is adapted to be released from said sliding rack upon movement of said trigger to approximately said end position, thereby allowing movement of said trigger back to said start position.

7. The connector insertion and removal tool of claim 1 wherein said first and second jaws are provided with angled lead-outs and are further contoured along their lengths to allow for movement of said connector insertion and removal tool around cables without snagging said cables or otherwise causing harmful contact to said cables.

8. The connector insertion and removal tool of claim 3 wherein said handle is contoured for placement in the palm of a user's hand and further wherein said trigger is contoured for activation by fingers of a user's hand.

9. A tool for the insertion and removal of connectors comprising:
- a tool housing having a handle;
- a trigger extending from said housing and moveable from a start position toward an end position near said handle;
- a set of first and second jaws extending from a front of said housing, said first and second jaws having respective first and second gripping ends, said first and second gripping ends moving toward each other upon movement of said trigger toward said handle; and
- a ratchet mechanism maintaining a gripping force on said connector when movement of said trigger is stopped between said start position and said end position.

10. The tool of claim 9 wherein said set of jaws is removable from said housing and replaceable with a second set of jaws different from said first set of jaws.

11. The tool of claim 10 wherein said first set of jaws is attached to said housing by a first set of thumb screws extending through a first plate adapted to pivotally hold said first set of jaws and said second set of jaws are provided with a second plate adapted to pivotally hold said second set of jaws.

12. The tool of claim 9 wherein said first and second gripping ends are removable from said first and second jaws and replaceable with a second set of first and second gripping ends.

13. The tool of claim 9 wherein said set of first and second jaws is adapted to supply between approximately two pounds and approximately thirteen pounds of gripping force between said gripping ends upon movement of said trigger toward said handle.

14. The tool of claim 9 further comprising a light attached to said tool housing for illuminating a region of said gripping ends.

* * * * *

UNITED STATES PATENT AND TRADEMARK OFFICE
CERTIFICATE OF CORRECTION

| | |
|---|---|
| PATENT NO. | : 7,035,519 B2 |
| APPLICATION NO. | : 10/833699 |
| DATED | : April 25, 2006 |
| INVENTOR(S) | : Roger D. Seagroves et al. |

It is certified that error appears in the above-identified patent and that said Letters Patent is hereby corrected as shown below:

Column 6, Line 67, "said and tigger" should read -said trigger-.

Signed and Sealed this

First Day of August, 2006

JON W. DUDAS
*Director of the United States Patent and Trademark Office*